United States Patent
Ugolin et al.

(10) Patent No.: US 7,136,517 B2
(45) Date of Patent: Nov. 14, 2006

(54) IMAGE ANALYSIS PROCESS FOR MEASURING THE SIGNAL ON BIOCHIPS

(75) Inventors: Nicolas Ugolin, Paris (FR); Mory Doukoure, Nimes (FR); Olivier Alibert, St Germain-les-Corbeils (FR); Sylvie Chevillard, Kremlin-Bicetre (FR)

(73) Assignee: Commissariat a l'Energie Atomique, Paris (FR)

( * ) Notice: Subject to any disclaimer, the term of this patent is extended or adjusted under 35 U.S.C. 154(b) by 661 days.

(21) Appl. No.: 10/173,672

(22) Filed: Jun. 19, 2002

(65) Prior Publication Data

US 2004/0001623 A1    Jan. 1, 2004

(51) Int. Cl.
*G06K 9/00* (2006.01)

(52) U.S. Cl. .................................... 382/129
(58) Field of Classification Search ............. 382/129
See application file for complete search history.

(56) References Cited

U.S. PATENT DOCUMENTS

| | | | | |
|---|---|---|---|---|
| 6,349,144 | B1* | 2/2002 | Shams ........................ | 382/129 |
| 6,980,677 | B1* | 12/2005 | Niles et al. ................. | 382/128 |
| 2002/0022226 | A1* | 2/2002 | Nakao et al. ................. | 435/6 |
| 2002/0055102 | A1* | 5/2002 | Stern ............................ | 435/6 |
| 2003/0048933 | A1* | 3/2003 | Brown et al. ................ | 382/128 |
| 2003/0129648 | A1* | 7/2003 | Shams ............................ | 435/6 |
| 2003/0219150 | A1* | 11/2003 | Niles et al. .................. | 382/128 |
| 2004/0001623 | A1* | 1/2004 | Ugolin et al. ............... | 382/170 |
| 2004/0047499 | A1* | 3/2004 | Shams ......................... | 382/129 |

OTHER PUBLICATIONS

Bowman C et al : "auotmated analysis of gene-microarray images", May 2002, IEEE CCECE2002, Candian conference on Electircal and computer eningeering, vol. 2, pp. 1140-1144.*
Tahi F et al: "auotmatic Quantitation of Hybridizations signals on CDNA arrarys" Jun. 1, 2002, Eaton Publishing, Natick US, vol. 32 No. 6, pp. 1386-1397.*
G.J McLachian, R.W. Been and D. Peel, "A mixture model-based approach ot the clustering of microarray expression data", Mar. 2002, Bioinformatics, vol. 18, No. 3, pp. 413-418.*

* cited by examiner

*Primary Examiner*—Daniel Miriam
*Assistant Examiner*—ONeal R. Mistry
(74) *Attorney, Agent, or Firm*—Oblon, Spivak, McClelland, Maier & Neustadt, P.C.

(57) ABSTRACT

The invention relates to an image analysis process for measuring the signal on biochips organized into one or several blocks each comprising a large number of spots each composed of at least one probe, the said process being characterized in that it comprises the following steps:
  a deposit is made with a constant pitch, the spots appearing in the form of a periodic and regular signal;
  this periodicity property is used to identify the position of the blocks and the spots, this periodicity being searched for on projections of the image in the x and y directions.

22 Claims, 27 Drawing Sheets

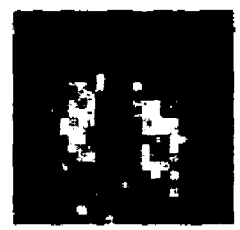
C
B
Fig3
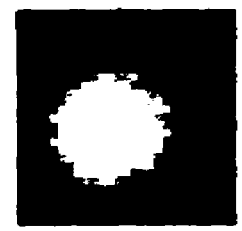
A

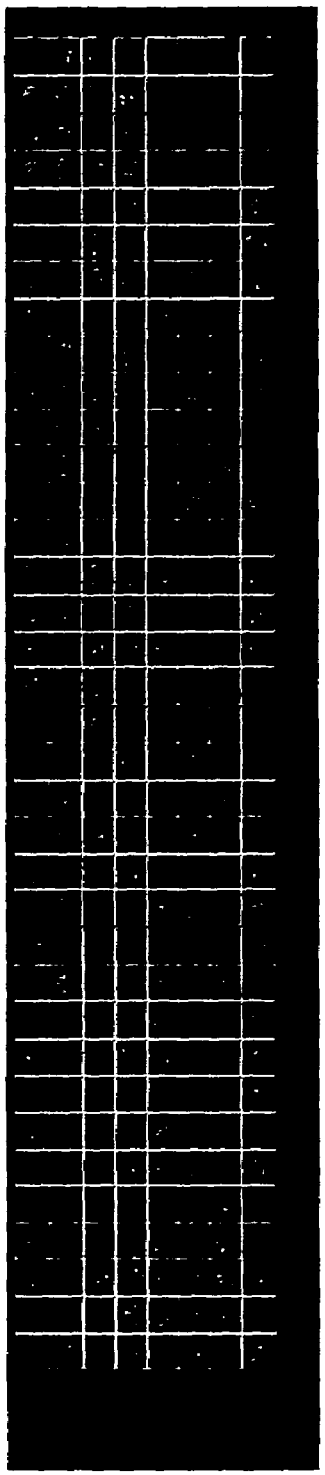

IMAGE ANALYSIS PROCESS FOR MEASURING THE SIGNAL ON BIOCHIPS

TECHNICAL DOMAIM

This invention relates to an image analysis process for measuring the signal on biochips.

STATE OF PRIOR ART

A biochip is composed of a small solid support, usually a microscope slide, on which specific DNA probes of cellular gene sequences are grafted or synthesized in situ in clearly defined positions. The probes are grouped in a spot occupying a few square micrometers containing about $10^9$ identical molecules. The set of spots thus forms a two-dimensional matrix with a complexity of up to $10^6$ spots/cm$^2$ as described in document reference [1] at the end of the description.

The probe addressing type on the support as described in document reference [2] can vary and therefore impose a particular geometry:

the in situ trace nucleotides synthesis method, for example by photochemical addressing that is known as VLSIPS (Very Large Scale Immobilized Polymer Synthesis): this method can very quickly synthesize a large number of different probes, fixation of previously synthesized probes by mechanical or electrochemical addressing. For mechanical addressing, the probes are sampled and placed on the slide by means of micropipettes or robot controlled pins.

The support may or may not be structured. For example, a biochip is known composed of a matrix of wells with gold electrodes. An electropolymerization is made on each electrode between a normal pyrrole and a pyrrole on which a probe has been fixed covalently.

All these methods according to known art lead to a two-dimensional matrix that can be used to screen and quantify a mix of several thousand DNAc molecules previously marked by a fluorochrome or any other molecules as described in document reference [3], in a single step. The hybridizing rate in a given position is determined starting from the intensity of the transmitted signal, which simultaneously indicates the nature and the quantity of molecules that were present in the mix of marked and studied molecules. It is also possible to study several conditions simultaneously. In this case, each condition needs to be marked by a different fluorochrome and they need to be mixed before they are hybridized on the biochip. There are thus one image for each fluorochrome during the slide reading step.

For example, in one step of making a biochip, the probes are deposited by a robot that has a print head with several pins, or rings. This type of robot with several rings, for example 4 rings, is used to take a small volume of samples, the deposit itself being made of a small dot that passes through the ring before coming into contact with the surface of the slide. A robot system with several hollow or solid pins, for example 48, is used to take the samples and to deposit them on the surface of the support.

The geometry of the deposit depends on the geometry of the robot head, the type of plates used to store the probes, the size of the pins, the pitch between each spot, etc. In general, a set of spots grouped in several distinct blocks is obtained, each block corresponding to a pin.

FIG. 1 illustrates a deposit made with a head with four pins or rings with plates of probes 10 and a biochip 11. After the slide has been read by a scanner, the intensity (or the intensities if a mix was initially co-hybridized) of the fluorescence is (are) quantified at each spot.

Image acquisition then consists of making a digital image of the biochip after excitation in order to measure the intensities of the different fluorescence signals. The biochip is read by a scanner equipped with excitation lasers corresponding to the absorption wavelengths of the fluorochrome(s) used. The fluorescence intensity is measured by a photomultiplier. The quality and resolution of the images obtained depend on the scanner used. Different types of instruments can be used, such as confocal and non-confocal scanners, CCD camera scanners, etc.:

a confocal scanner has a high quality system of lenses that can excite a small area x, y over a small field depth around the focal plane. The fluorescent emissions in this region are recovered at a point on the photomultiplier, this region corresponding to about one pixel of the image. Only the signal contained in the focal plane is read, and everything outside this slice and this precise region will not reach the detector. Parasite signals such as dust are minimized if they are not in the focal plane of the lens. Otherwise, there is no mix between the signals in two adjacent regions. Therefore, the dust is well isolated and could be eliminated by a subsequent treatment. On the other hand, since the acquisition plane is very thin, it may be necessary to make several passages on the slide in order to correct read errors of the photomultiplier and to obtain less noisy images.

a non-confocal scanner cannot give such precise focusing. The retrieved signal originates from a larger region and includes a large thickness of the slide. The intensity retrieved at a precise point on the photomultiplier corresponds to an average within a specific neighborhood. Therefore the signal is diluted. Consequently, the image is very much smoothed and the contrast is lower, a CCD camera scanner uses a high precision camera to acquire the image. The image quality depends directly on the acquisition time.

This read step is very important. A good compromise between the contrast, the background noise intensity and the resolution is essential to overcome difficulties in analyzing images (location of spots, location of dust, segmentation of signals, etc.), and to optimize the reliability of the results. The precision and resolution of the scanner are controlling factors for the analysis of DNA biochips.

A filter method can be used to optimize this step, and statistically improve the image resolution.

A digital image, for example an image in the 16-bit Tiff (Tag-based Image File Format) format is obtained at the output from the scanner. This format is a good compromise between the size of the files to be stored and the information quality, in other words the number of intensity levels that can be coded. Consequently, it is very frequently used to record images originating from many different scanners. Furthermore, this type of Tiff format is not specific to any system, can easily be manipulated and enables the addition of complementary private information.

The intensity of each pixel is discretized on a scale of 65536 gray shades, from the lowest intensity (0) to the highest (65535). A pixel is the smallest measurable area on the image. Its intensity represents the average fluorescence emitted by the corresponding resolution surface area on the biochip. It is the smallest hybridizing unit that can be measured on this type of image. The intensity is proportional to the number of DNAc molecules fixed to the corresponding region of the slide. The density of the molecules on a spot is not necessarily homogeneous. Spots that are composed of a variable number of pixels with different intensities can have a very heterogeneous signal. As shown in FIG. 2, an image is in the form of a large number of spots for which the relative addresses are perfectly identified.

The problem to be solved by the invention is to:

precisely position hybridizing areas in order to detect each probe and to quantify its hybridizing level. Positioning of spots is one of the limiting steps in automation of the image analysis process. It requires extreme precision to guarantee reliability and reproducibility of hybridizing data. In prior art, there is no fully automatic software for positioning spots/signals.

very precisely quantify the fluorescence intensity due to hybridizing alone, eliminating signals due to background noise and any dust or parasite signals.

The difficulty in automating a procedure for precisely positioning spots on the biochip image (Spot Finding Problem) is due to three main constraints:

the existence of diffuse noise and artefacts: fluorescence of the slide, unhybridized probes and dust contribute to anisotropic background noise on the image, variability in the position of the spots, uncertain geometry of the spots.

Each spot is composed of a variable number of pixels with heterogeneous intensity. This is due firstly to the probe deposition method which generates more or less circular spots depending on the robots used, and secondly to the quantity of DNAc that is hybridized on the probes. As illustrated in FIG. 3, the spots may be in the shape of a ring or disk, or they may be composed of a set of small heterogeneous sub-regions.

This heterogeneity in the geometry of the spots and the presence of dust or artefacts are problematic considering the size of the spots and explain why conventional morphological detection methods are inefficient. Thus, methods based on contour detection such as that defined in document reference [4] used for positioning of radio-marked DNA on nylon membranes, or methods developed for positioning of proteic spots on 2D PAGE gels, cannot be applied to small spots (about 10 times smaller than spots on nylon membranes). The existence of these three problems, namely the very small size of the spots, their imprecise morphology and the anisotropic background noise make these methods unsuitable.

Fluorescence signal extraction software according to prior art is usually based on four steps:

a block delimitation step, a grid positioning step, a step to determining pixels belonging to the hybridizing zone, a step to calculate a spot fluorescence intensity estimator (average, median, etc.), All this software requires precise parameter settings for the geometry of hybridizing areas.

As described in document reference [5], in some software the positioning of hybridizing areas begins with semi-automatic placement of a grid. Each spot block has to be positioned manually on the image. For each block, the next step is to supply precise parameters of the two-dimensional matrix that makes it up (number of rows, number of columns, pitch between spots, spot size) in order to place a grid. In combining these geometric parameters and a protected analysis, the image is segmented into frames inside which a more or less circular variable sized mask delimits the hybridizing area. This mask is centered on the maximum intensity.

Document reference [6] describes software that uses a slightly more automated and more reliable spot positioning method. However, it is necessary to supply all information about the probe deposition geometry, in other words the number of rows and columns in each block of the image. The blocks are isolated after supplying the position of the first spot in the image. The pre-grid is then placed automatically around the different spots as a function of the previously supplied parameters. Each frame is analyzed individually to optimize centering of the hybridizing area. Since the spots have not yet been properly identified, the center of each spot is determined approximately by the center of intensity of its own frame, in the same way as for the center of mass. For example, for an image I with pixel intensities I(x,y), the center of intensity along x is given by the estimate:

$$x_0 = \frac{\sum_{x,y} xI(x, y)}{\sum x, yI(x, y)}$$

None of these software programs according to known art puts forward a completely automatic solution for the four steps mentioned above. The delimitation step is particularly penalizing. All knowledge about the geometry of the deposit has to be input, and usually the block has to be positioned on the image. The semi-automatic grid positioning step leads to a serious lack of reliability on areas of the image with a low contrast. However, quantification must be exact and precise in order to perform analytic processing. Positioning imperfections are inevitable sources of errors. A painstaking check of the entire biochip is necessary at the end of the step to calculate a spot fluorescence intensity estimator. Many problems have been observed in areas with low contrast.

All these initialization, verification and reworking steps may take several hours and are indispensable before starting to quantify the spots. In the laboratory, a single experiment may be based on the use of several hundred biochips. Therefore, it is essential to develop a fast and efficient software requiring a minimum number of interactions with the operator and minimizing the verification steps.

Furthermore, the measurement of the spot fluorescence intensity is imposed by the software used and is not necessarily suitable for the deposition type used.

Therefore, the purpose of the invention is to solve the problems mentioned above by putting forward an image analysis process for measuring the probe reaction rate on a biochip.

PRESENTATION OF THE INVENTION

The invention relates to an image analysis process for measuring the signal on biochips organized into one or several blocks each including a large number of spots each comprising at least one probe, the said process being characterized in that it comprises the following steps:

a deposit is made with a constant pitch, the spots appearing in the form of a periodic and regular signal, this periodicity property is used to identify the positions of blocks and spots, this periodicity being searched for on image projections in x and y.

Advantageously, averaged orthogonal projections are used with two x and y axes in the plane of the biochip so that the periodic signal can be amplified and thus two histograms $\overline{H}_j$ and $\overline{H}_i$ are obtained. The discrete single dimensional Fourier transform (FFTD) is then used to identify the main frequencies of the image in x and y, the maximum power of the transform $P(\omega)$ giving the values $\omega_0$, from which the repetition periodicities $\lambda_0$ of the spots in x and y are deduced. A variable threshold can be applied to the two histograms $\overline{H}_j$ and $\overline{H}_i$ the optimum threshold being given by the value that gives the maximum of the equation $$P(\omega_{max}) / \sum_{i=10}^{50} P(\omega i),$$

the distribution of the periodicity $\lambda$ then being examined along the two histograms $\overline{H}_j$ and $\overline{H}_i$, a window with a size 2 $\lambda 0$ sliding along the two histograms. The variations of the power of the Fourier transform of these histograms are explored locally, regions in which there is a loss of power corresponding to regions between blocks, and this method supplies a global cutout of the image.

A window with a width of $\lambda_0$ and a length of $2\lambda_0$ centered on the global cut line is used to produce a fine delimitation of the boundaries of each block, and the presence of excessively intense and therefore suspicious signals can then be explored locally, and the limit of the blocks around the signal may be redefined if necessary. This is done firstly by extending the window by $\lambda_0/2$ on one side of the limit and then on the other side and if the signal increases only for one of the two extensions of the window, the limit of the block is shifted by $\lambda_0$ into the adjacent block for which there was no increase in the signal, if there was no increase in the signal or if the signal was increased for the two shifts, then either the signal was a parasite signal or the two blocks are very close and in both cases the probability of the signal belonging to the right and to the left of the cut line is calculated, and $P(\omega)$ is obtained for each half projection with and without a suspicious signal, the gain obtained then being equal to:

$$\text{Gain} = \frac{P(\omega + \text{signal})}{P(\omega - \text{signal})}$$

if the gain is greater than 1 for one of the two half projections only, the signal considered is assigned to it, by shifting the cut line by $\lambda_0/2$ into the adjacent block; if the gain is not greater than 1 for either of the two blocks, then it is a parasite signal and the cut line is not shifted; if the gain is greater than 1 for both half projections, the signal is in phase with the two half projections and therefore the blocks are very close and in phase, and the signal is assigned to the block for which the gain is highest, by shifting the cut line by $\lambda_0/2$ into the adjacent block.

Advantageously, unilluminated spots are isolated as follows:
  the histograms $\overline{H}_j$ and $\overline{H}_i$ are made for the rows and the columns of a block respectively,
  a FFTD transform is applied to the two histograms in each block, the maximum value of $P(\omega)$ gives the periodicity $\lambda_0$ of the spot repetition, and the least squares method is used to align projections with a sine curve with the following equation:

$A \sin(\omega_0 X i + \Phi)$
  where: $\omega_0 = \dfrac{2\pi}{\lambda_0}$

A: average amplitude of the projections,
  $\Phi$: phase shift to be determined.

The next step is to apply a digital reconstruction algorithm to these histograms, which is used to start from the initial projections and recreate a signal with almost identical amplitudes, the use of a threshold then making it possible to produce a binarized representation of the created histogram and to determine the precise positions of the spots present.

The binarized projection can be convoluted using a sinusoidal function of $\lambda_0$ such as:

$$\tilde{H}_i = \sum_{j=0}^{\lambda 0/2} \left( A \sin(\omega \text{ time } j) \times Hb_{i+j-\lambda/4} \right)$$

and by searching for the minimum and maximum values of the convolution function, it is then possible to automatically reconstruct a grid surrounding all detectable spots.

Advantageously, several images with low excitation and low detection can be created and accumulated into a single image.

Advantageously, a high resolution image is created and the resolution of the image is then reduced artificially by replacing n adjacent pixels by the average of the n pixels which thus reduces the size of the image by a factor of n, and a homogeneity filter is applied to eliminate the pixel with the greatest heterogeneity with regard to the adjacent pixels.

Advantageously, pixels within each spot can be sorted to identify the different types of pixels present: background noise, hybridizing signal, parasite signal.

Advantageously, a modified EM algorithm is applied in which the classes are made smaller and the concept of a pixel that does not belong to any class is introduced, by applying a threshold to the calculated probability that it belongs to one of the two or three main classes.

The following steps could be used:
  an initialization step, which consists of building up a blurred distribution table $C_i(k)$ of the pixels,
  an estimating step in which the new blurred distribution table is calculated,
  a maximization step, in which the mix parameters $\theta^m$ are recalculated, and these last two steps are reiterated until convergence of the log-probability classification.

A new convergence estimator can be introduced based on similarity or the calculated distance between the real distribution of pixels and the recalculated distribution using the mix parameters.

In one advantageous embodiment, the invention relates to an image analysis process that comprises the following steps:
  an image filter step to reduce background noise, by very slightly reducing the significant signal and by increasing the signal to noise ratio,
  a degrading filter step increasing the image contrast between the background noise and the hybridizing signal,
  a step for positioning the blocks on the image of the biochip starting from external data about the number of blocks in rows and in columns, but in some cases these two items of data may be omitted,
  a step to automatically determine the position of each spot, including the position of spots for which there was no signal because there was no hybridizing within its block,
  a step in which the spot is automatically broken into segments to determine pixels representative of the reaction and an evaluator of the spot signal is calculated by the average, the median, etc.

Advantageously, during the positioning step, a method based on identification of the local loss of the periodic signal is used, such as the power of the Fourier transform of the spot projection signal onto the axes by rows or by columns.

Advantageously, during the filter step, a first filter is used to rectify the image, if necessary, by alignment of the spots in the same block. During the filter step, a second filter may also amplify the signals specifically originating from the spots and level other types of signals.

Advantageously, the position of each block in the image is refined.

BRIEF DESCRIPTION OF THE DRAWINGS

FIG. 3 illustrates different types of spots obtained.

FIG. 15 illustrates an example of a grid automatically placed on a block.

DETAILED PRESENTATION OF EMBODIMENTS

The process according to the invention is an image analysis process for measuring the reaction rate of probes arranged on a solid substrate forming a biochip organized into one or several blocks each comprising a large number of spots each composed of at least one probe.

The images obtained during the read phase are composed of several blocks of relatively well aligned spots arranged at a constant pitch.

In the process according to the invention, the four main steps in the image analysis mentioned above, taking account of difficulties that exist with devices according to prior art, namely:

- delimitation of blocks of spots,
- position of a grid around each block to determine hybridizing areas,
- determination of pixels belonging to the spot,
- calculation of an estimator of the spot fluorescence intensity, are handled independently, making them as fully automated as possible.

The fixed geometry of the head of the robots used leads to the formation of blocks that can be approximated as homogeneous x by y blocks such as 4 by 4 or 48 by 12 blocks depending on the number of pins fitted on this head. If the block is not homogeneous (blocks are missing at the end of the spot), the processing will be done in the same way as for a homogeneous block. The empty spot frames will be eliminated later. Since the deposition is done with a constant pitch, spots appear in the form of a periodic and regular signal. The signal periodicity is lost between each block of spots.

The process according to the invention uses this periodicity property to identify the positions of blocks and spots. This periodicity is searched for on row and column projections of the image, in x and y respectively. However, due to possible variations in the image, these projections cannot be used directly for all types of images.

Delimitation of Blocks of Spots

Figure 1:
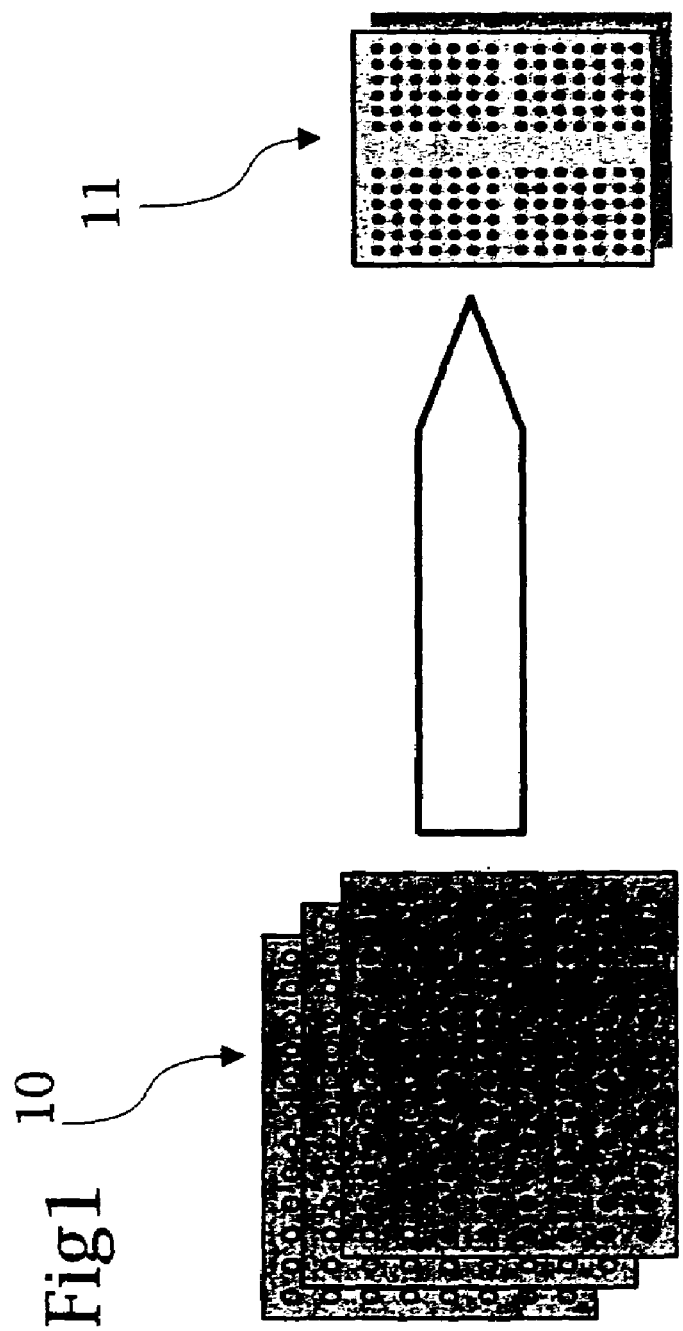
FIG. 1 illustrates a deposition of a probe made using a device according to known art.
Figure 2:
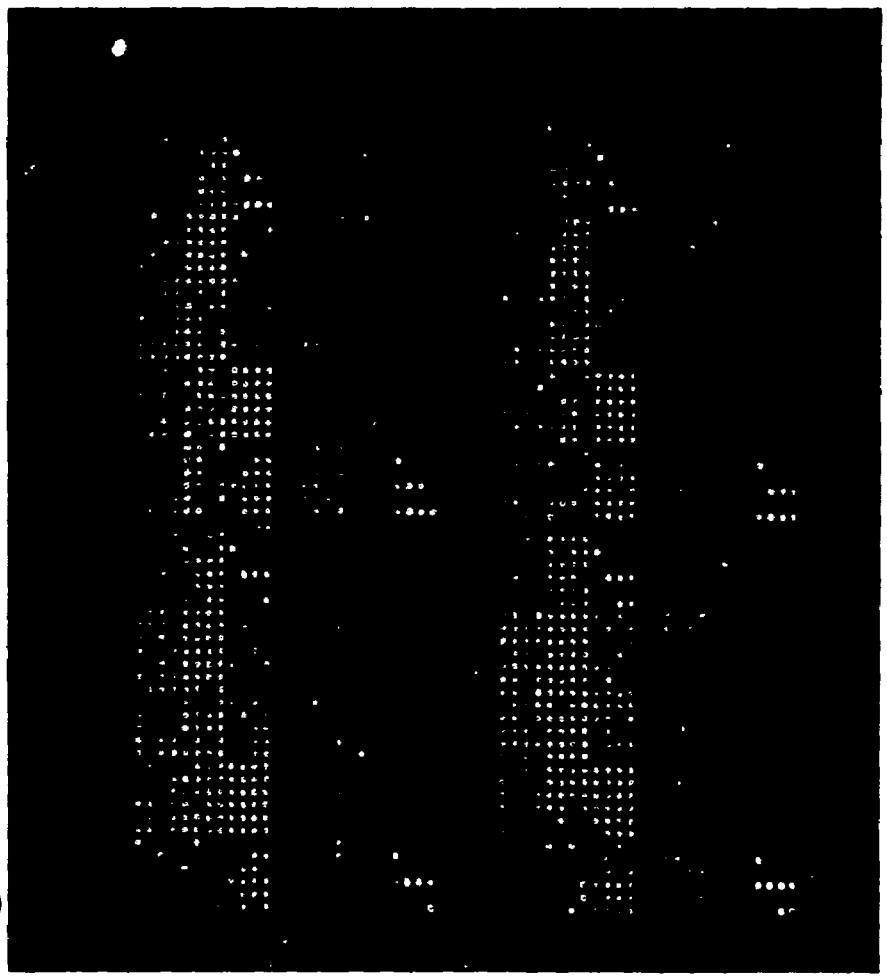
FIG. 2 illustrates a typical image of a chip.
Figure 4:
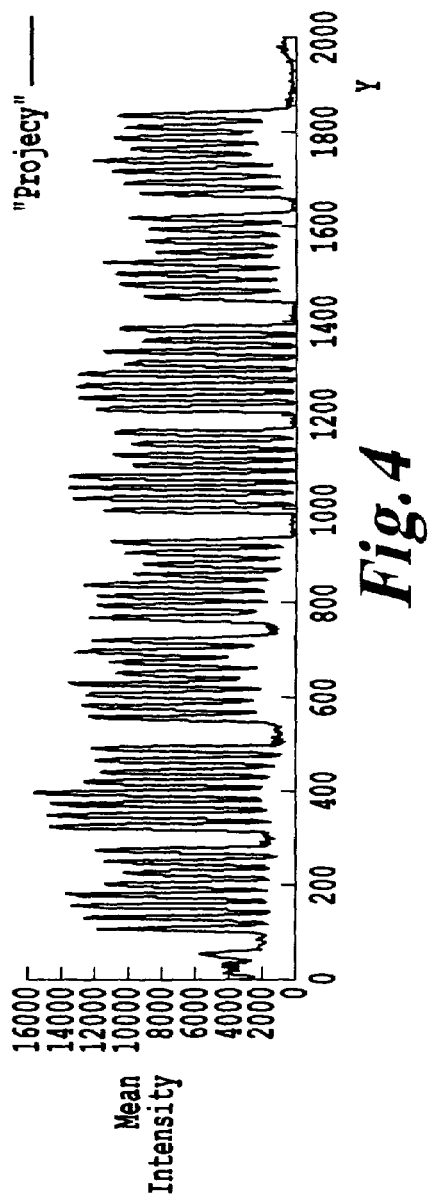
FIG. 4 illustrates a histogram Hi (projection of the image in columns).

The blocks are more or less well aligned along x and y. Averaged projections orthogonal to the axes are used to amplify the main periodic signal, and singular artefact type signals are minimized. The result is two histograms $\overline{H}_j$ and $\overline{H}_i$ like that illustrated in FIG. 4, firstly for all the pixels in the rows, and secondly for the pixels in the columns.

$$\overline{H}_j = \frac{1}{n_i} \sum_{i=0}^{n_i-1} A_{i,j} \qquad (1)$$

$$\overline{H}_i = \frac{1}{n_j} \sum_{i=0}^{n_j-1} A_{i,j}$$

where:

$A_{i,j}$: intensity of a pixel with coordinates $(i,j)$ $n_i$ and $n_j$: dimensions of axes as a function of height and width of the image.

The single dimensional discrete Fourier transform (FFTD) can then be used to identify the main frequency of the image. This mathematical tool is very frequently used in image analysis, its result being the frequency representation of the original space.

The choice of working on these two histograms $\overline{H}_j$ and $\overline{H}_i$ is made for reasons of speed, since it is much more difficult to use the 2D FFTD transform on the entire image.

The power of the transform $P(\omega)$ is calculated for values of $\omega$ such that $\omega=2\pi/\lambda$, $\lambda$ may for example be included in the interval [10 pixels, 50 pixels] corresponding to the minimum and maximum amplitudes of the distance between the spots for the robots used, respectively:

$$P(\omega) = \left(\sum_{i=0}^{n-1} \overline{H}_i \cos(\omega x i)\right)^2 + \left(\sum_{i=0}^{n-1} \overline{H}_i \sin(\omega x i)\right)^2 \quad (2)$$

The maximum value of $P(\omega)$ gives the value $\omega_0$, from which the spot repetition periodicity $\lambda_0$ is deduced.

Figure 5:
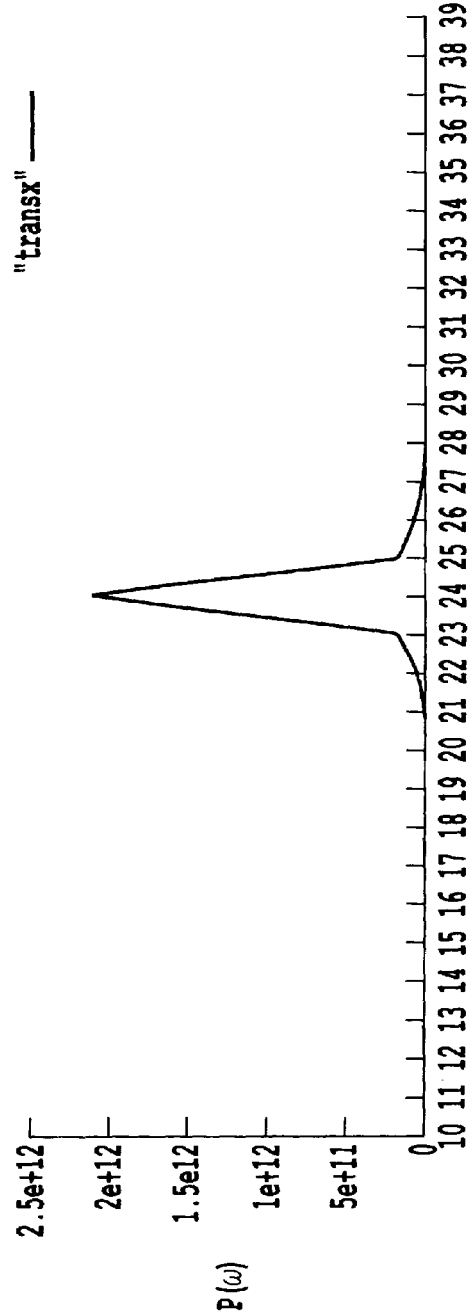
FIG. 5 illustrates a P($\omega$i) diagram.

FIG. 5 illustrates the diagram of $P(\omega_i)$.

The interval may possibly be adjusted to the deposition frequency if it is significantly different.

The background noise can introduce parasites to the periodicity $\lambda_0$. Therefore a variable threshold is applied to the two histograms $\overline{H}_j$ and $\overline{H}_i$. The value of this threshold is determined as follows. The following ratio is calculated for a first value of the threshold S0, arbitrarily fixed very low:

$$\frac{P(\omega \max)}{\sum_{i=10}^{50} P(\omega i)} \quad (3)$$

where $P(\omega i)$ corresponds to the calculated value of $P(\omega)$ for the values $\overline{H}_i > S0$ and where $P(\omega_{max}) =_{max} P(\omega i)$.

The value of the threshold is then increased by a fixed step, and this calculation is repeated. The optimum threshold is given by the value that gives the maximum value for equation (3) above.

Figure 6:
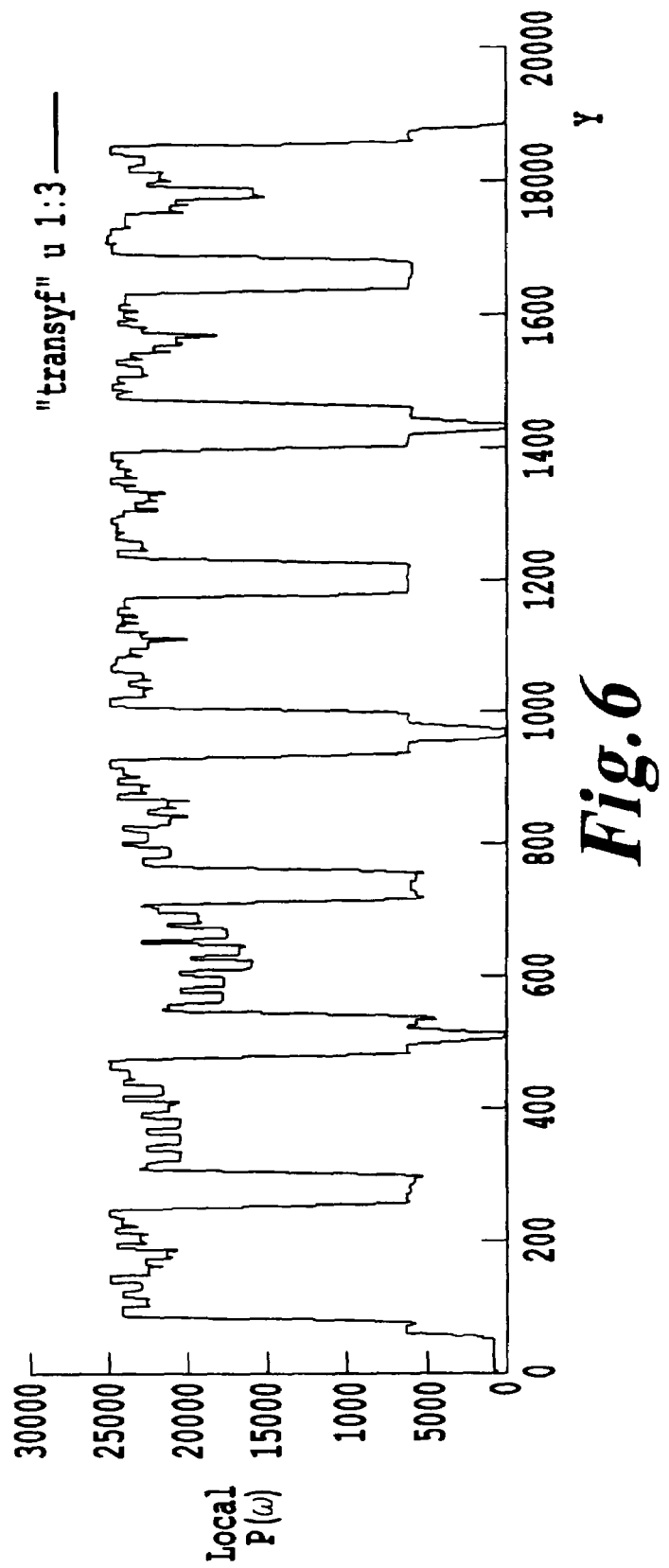
FIG. 6 illustrates a P($\omega_0$) diagram.

The distribution of the periodicity $\lambda$ is then examined along the two histograms $\overline{H}_j$ and $\overline{H}_i$. A window with size 2 $\lambda$0 slides along these histograms. As shown in FIG. 6 that illustrates the diagram of $P(\omega_0)$ values, $P(\omega_{0max})$ is obtained along this window for each calculation position, for intensity values greater than the threshold that was determined previously, where:

$$P(\omega_0) = \left(\sum_{i=j}^{j+2\lambda_0} \overline{H}_i \cos(\omega_0 x i)\right)^2 + \left(\sum_{i=j}^{j+2\lambda_0} \overline{H}_i \cos(\omega_0 x i)\right)^2 \quad (4)$$

In regions between blocks, $P(\omega_0)$ passes through a minimum so that the limits of the blocks can be identified.

Figure 7:
FIG. 7 illustrates an original image.
Figure 8:
FIG. 8 illustrates a cut-out image.

For an image containing n blocks along one of its axes, there are n+1 spaces between blocks. But due to missing spots, the $P(\omega_0)$ signal may pass through more than n+1 minima. The regions between blocks corresponding to a total lack of spots generate the lowest minima. Therefore, knowing the number of blocks, it is easy to extract the n+1 relevant values on the rows and on the columns. It is then possible to start from an original image such as that shown in FIG. 7, and to break the image down into the number of expected blocks as illustrated in FIG. 8.

However, in a large number of cases the blocks are not well aligned. The positions of the limits of each block are refined using a window that slides along the cut line of each block. For example, the length of this window may be 2 $\lambda_0$, parallel to the cut line between two blocks, and its width may be $\lambda_0$ perpendicular to the cut line. This window is centered on the cut line. While this window is sliding, if the average signal calculated inside it becomes significantly greater than the average signal along the cut line (for example the average +2σ), this increase may be due to the presence of one or several spots. Therefore, it is checked if the signal is in phase with one of the blocks on each side of the cut line.

In a first step, the window is extended by $\lambda_0/2$ on one side of the limit and then on the other side:

if the average signal increases only for one of the two extensions of the window, the block limit is shifted by $\lambda_0$ in the adjacent block for which the signal is not increased.

If there is no increase in the signal or if the signal was increased for the two shifts, then this means either that it is a parasite signal, or that the two blocks are very close. In both cases, the probability of the signal belonging to the right and left of the cut line is calculated. This is done by making a projection parallel to the cut line considered, of the strip of the image corresponding to the height of the sliding window. For the dimension perpendicular to the cut line, the strip corresponds to putting the two consecutive blocks adjacent to each other, and for the dimension parallel it corresponds to the height of the sliding window. The result is then a projection of the strip from two consecutive blocks. The cut line is shifted by $\lambda_0/2$ on each side of the cut line and the value $P(\omega)$ is calculated (equation 3) for each half projection obtained. Each of the shifts alternatively includes and then excludes the suspicious signal in one of the half projections. Therefore, $P(\omega)$ is obtained for each half projection with and without a suspicious signal. The gain obtained can then be calculated:

$$\text{gain} = \frac{P(\omega + \text{signal})}{P(\omega - \text{signal})}$$

if the gain is greater than 1 for only one of the two half projections, the signal considered is assigned to it by shifting the cut line by $\lambda_0/2$ in the adjacent block. If the gain is not greater than 1 for either of the two blocks, then it is a parasite signal. The cut line is not shifted. If the gain is greater than 1 for the two half projections, the signal is in phase with the two half projections. Therefore, the blocks are close and in phase and the signal is assigned to the block for which the gain is highest, by shifting the cut line by $\lambda_0/2$ in the adjacent block. The final decision about where a block belongs is determined by the cardinal or parity rules described later. Thus, the limits of each block can be defined. To avoid any overlap in the adjacent block when the cut limit is being shifted (it is possible that the limits have to be shifted by a value less than or greater than the proposed values), the shift may be made by searching for the local minima in the shift direction.

Position of a Grid Around Each Spot

Figure 9:
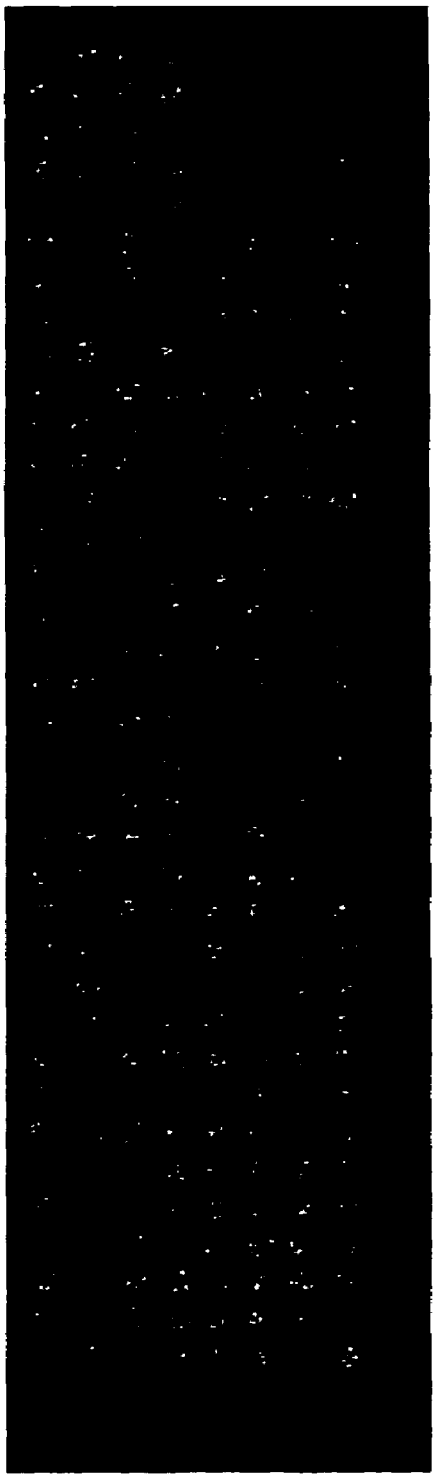
FIG. 9 illustrates an image of a block.

Positioning based on a mathematical morphology study of the entire image is difficult, due to heterogeneity in the geometry of spots, a possible lack of hybridizing at some points and the presence of spots with low contrast. FIG. 9 thus illustrates the image of a spot. Furthermore, it is very important to isolate unilluminated spots, in other words areas in which probes were deposited, but in which no marked DNAc of the analyzed mix is hybridized. This lack of hybridizing is important information for biologists. Once again, we work starting from orthogonal projections onto the axes using signal periodicity properties. Thus, the positions of the illuminated spots can be found and the theoretical positions of unilluminated spots can be extrapolated.

Figure 10:
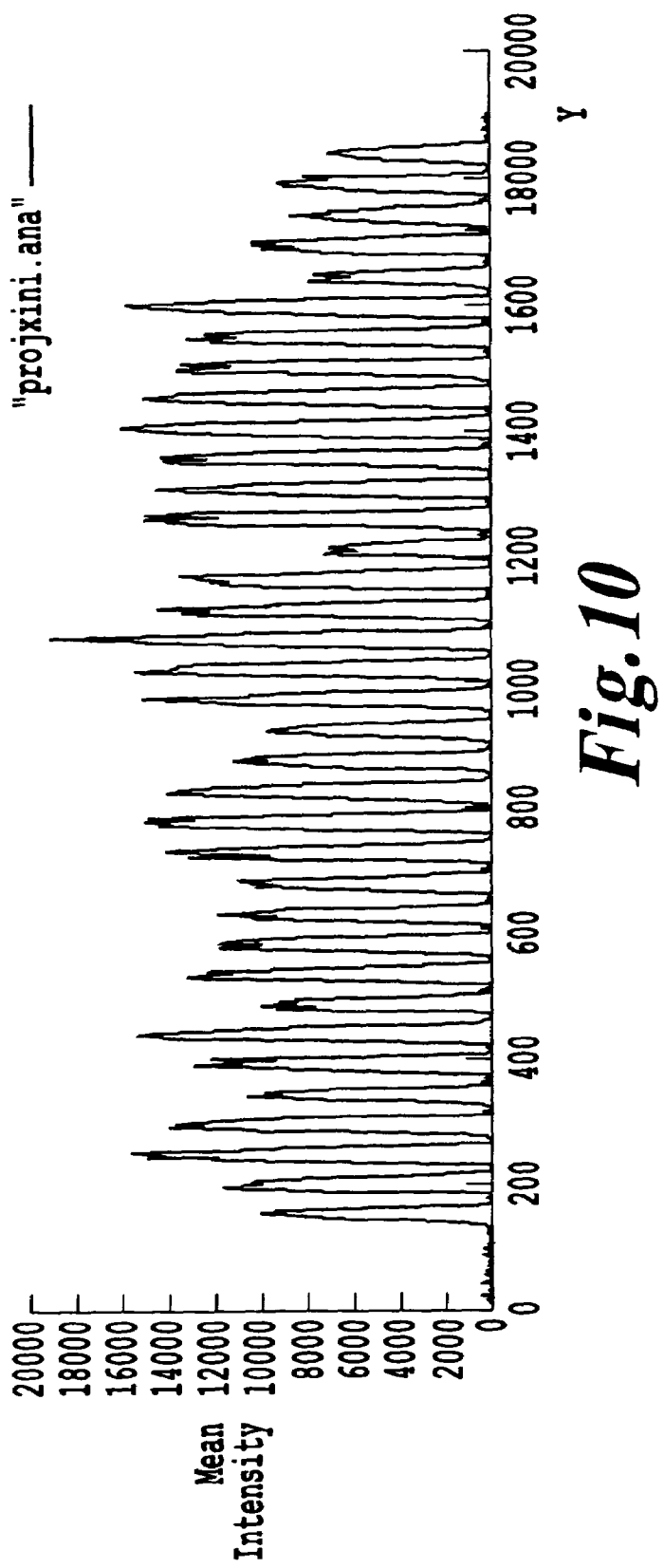
FIG. 10 illustrates a histogram Hi.

In the same way as for the positioning of blocks, the histograms $\overline{H}_j$ and $\overline{H}_i$ are made for rows and columns of a block respectively, by applying equations (1) to it. FIG. 10 then illustrates a histogram $\overline{H}_i$.

The periodicity measurement $\lambda_0$ of the spots signal is refined by applying an FFTD transform on the two histograms of each block. Once again, the maximum value of $P(\omega)$ in equation (2) gives the spot repetition periodicity $\lambda_0$.

The theoretical positions of the hybridizing zones (illuminated or unilluminated spots) are identified using the least squares method to align projections with a sine curve with equation:

$$A \sin(\omega_0 x i + \Phi) \quad (5)$$

where: $\quad \omega_0 = \dfrac{2\pi}{\lambda_0}$

A: average amplitude of the projections,
$\Phi$: phase shift to be determined.

The average amplitude A of the projections is calculated as follows:

$$A = \sqrt{\dfrac{\sum_{i=0}^{n} (\overline{H}i)^2}{n}} \quad (6)$$

The phase of the sine curve is calculated by sliding a sinusoidal pattern with amplitude A along the profile of the histogram $\overline{H}_i$ calculated on a period $\lambda_0$. For each position, the RMS (Root Minimum Square) value between the pattern and the projection is calculated.

$$RMS_i = \sum_{j=0}^{\lambda_0} A(\sin(\omega j) - \overline{H}_{i+j})^2 \quad (7)$$

The smallest $RMS_i$ value obtained gives the position at which the pattern is best aligned with the signal from a spot line. The phase shift obtained from this position j is such that:

$$\Phi = -\omega_0 \times j \quad (8)$$

Figure 11:
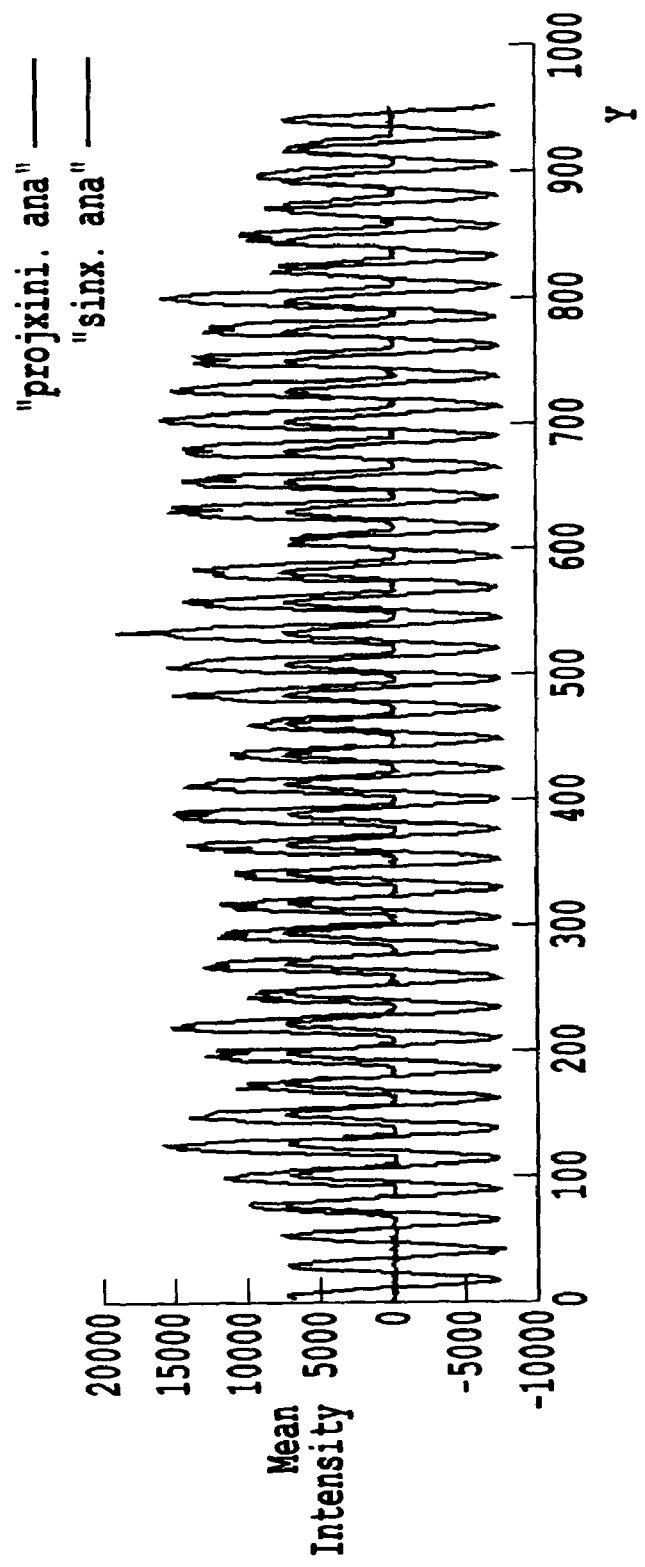
FIG. 11 illustrates an alignment of projections with a sine curve.

FIG. 11 illustrates the alignment of projections with a sine curve.

Figure 12:
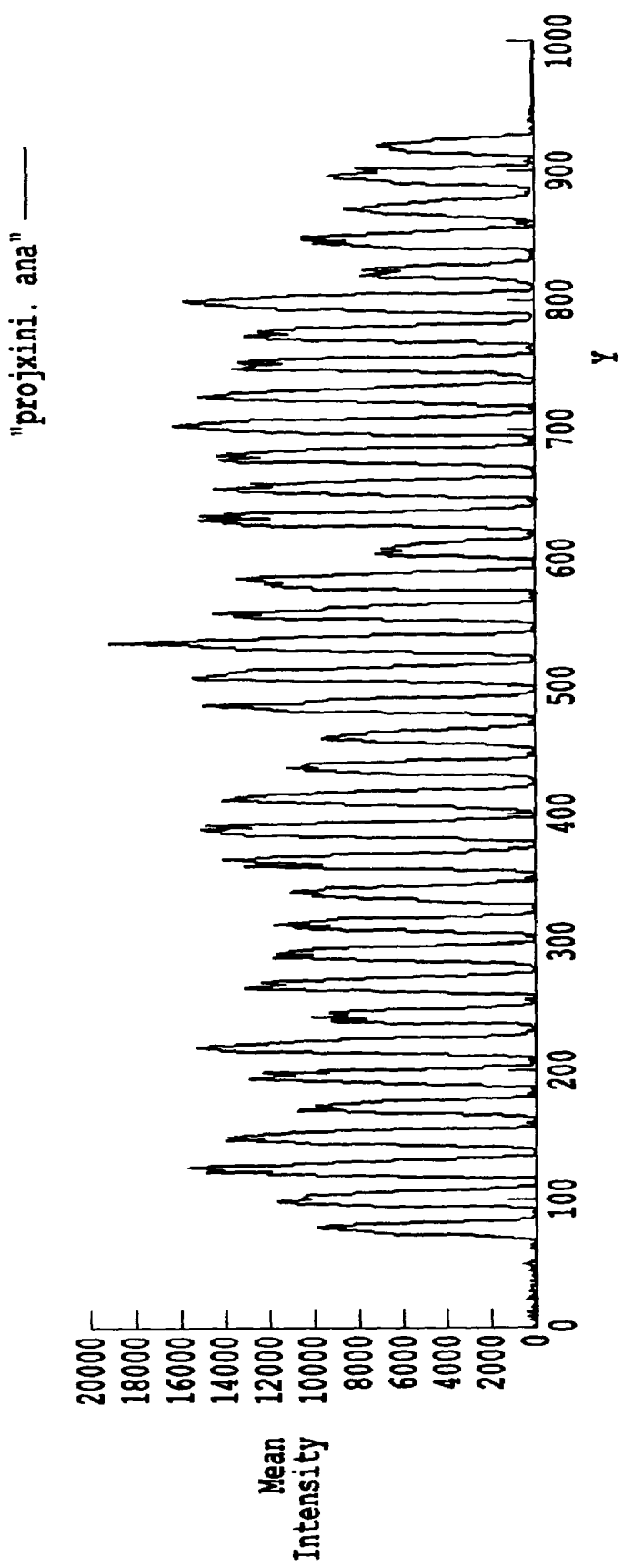
FIG. 12 illustrates a histogram Hi.

The average positions of the spots are identified precisely by identifying maximum values of histograms $\overline{H}_j$ and $\overline{H}_i$, where a histogram $\overline{H}_i$ is illustrated in FIG. 12.

Figure 13A:
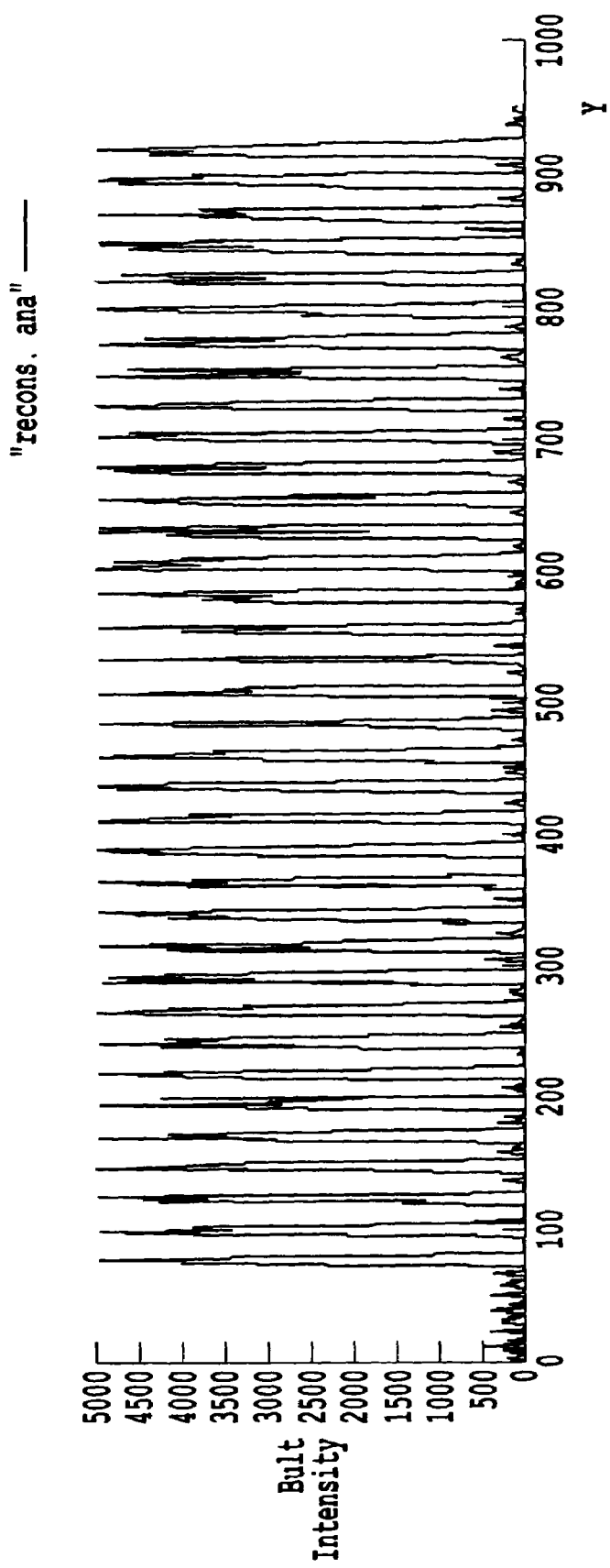
FIG. 13a illustrates a histogram after digital reconstruction.

Therefore the values of the histograms are centered. A digital reconstruction algorithm is then applied to these histograms, so that a signal with almost identical amplitudes can be reconstituted from the initial projections. FIG. 13a thus illustrates histogram $\overline{H}_i$ after digital reconstruction.

Figure 13B:
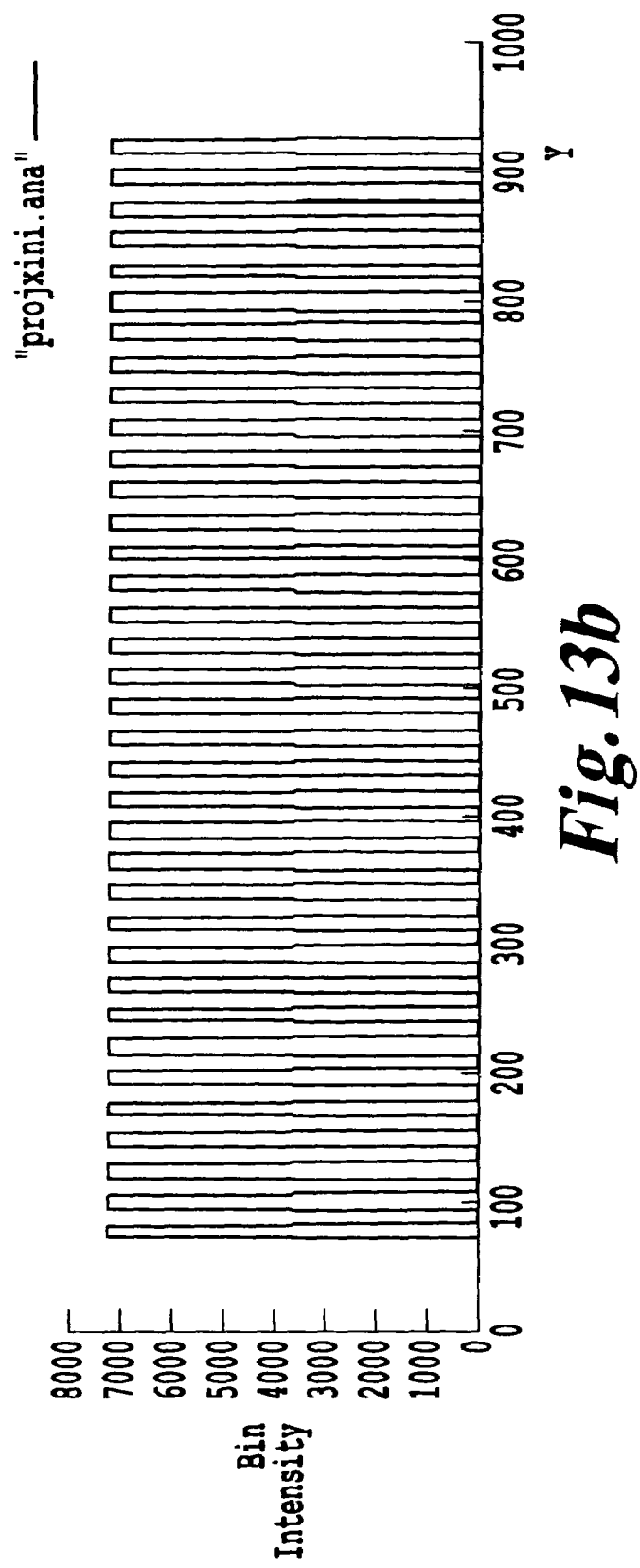
FIG. 13b illustrates a binarized histogram.

A threshold is then used to binarize the reconstructed histogram and to determine the exact positions of the spots present. FIG. 13b illustrates the binarized histogram $\overline{H}_i$.

During the deposition, a deviance of the spot can be observed that leads to local separation between the optimum sine curve and the projection itself or the binarized projection.

In order to compensate for this divergence, the applied sinusoidal function is optimized such that:

$$A \sin(\omega_0 x(I - \alpha x) + \Phi) \quad (9)$$

where the parameter $\alpha$ corrects the sine curve on the deviance of the deposits. The quantity $\alpha$ is chosen such that:

$$RMS_\alpha = \sqrt{\dfrac{\sum_{i=0}^{n-1}(A\sin(\omega_0 x(\alpha \chi) + \varphi) - \overline{H}_j)}{n}} \quad (10)$$

is a minimum.

The reconstructed histogram is used to precisely define the position of the spots with a high contrast. By adding information from the sine curve that gives the theoretical positions, all spots with a contrast that is too low to be detected can be found. The overlap between the theoretical positions (sine curves) and real positions (binarized projection) is optimized by convoluting the binarized projection using a sinusoidal function of $\lambda_0$ such that:

$$\tilde{H}_i = \sum_{j=0}^{\frac{\lambda_0}{2}} (A \sin(\omega \text{ time } j) \times Hb_{i+j-\lambda_0/4}) \quad (11)$$

Figure 14A:
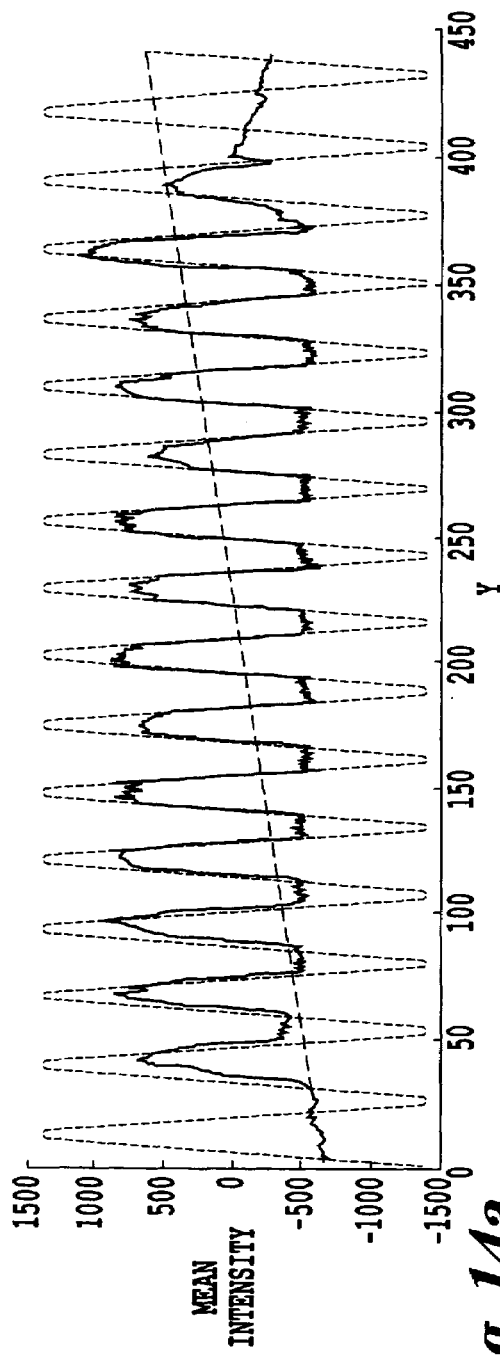
FIG. 14a illustrates a projection and a sinusoidal function before adjustment.

FIG. 14a illustrates a projection and a sinusoidal function before the adjustment.

Figure 14B:
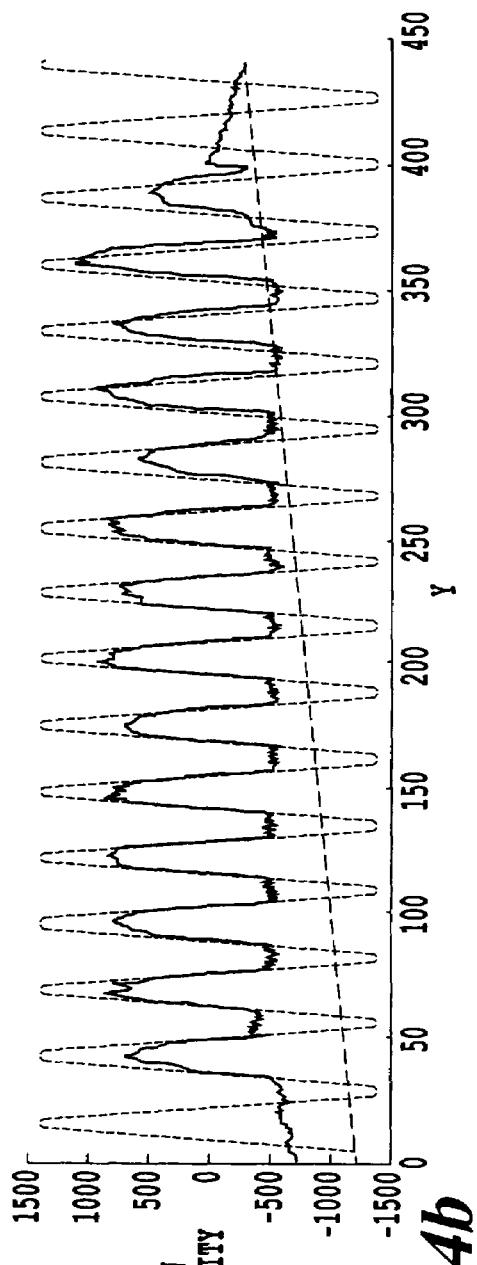
FIG. 14b illustrates a projection and sinusoidal function after adjustment.

FIG. 14b illustrates the projection and the sinusoidal function after the adjustment.

By searching for the minimum and maximum values of the convolution function, it is then possible to automatically reconstruct a grid surrounding all detectable spots. The position of missing spots is then deduced by cross checking between the convolution function (equation 11) and the sinusoidal function (equation 9). Each of the maximum values of the convolution function is assigned to the maximum value of the sinusoidal function (9) minimizing the Euclidian distance such that:

$$RMS_{max} = \sqrt{(\overline{H}_{max} - A\sin(\omega_0 x(\max i - \alpha x) + \Phi))^2} \quad (12)$$

where Nmax: the number of identified maximum values.

The missing spots correspond to the maximum values of the sinusoidal function (9) that were not assigned to the convolution function. The position of the missing spots can therefore be deduced. The spot phase and size rules defined below are applied to avoid the assignment of rows or columns of additional spots at the ends of blocks.

A convolution function signal cannot be defined as a row or column of spots unless it is in phase with the maximum values of the sinusoidal function (9), Initially, a maximum of the convolution function (11) cannot have a neighboring maximum between $i+\lambda_0/4$ and $i+\lambda_0/2$ (these thresholds can obviously be defined by parameters as a function of the type of slide used).

Finally, for extreme maxima of the convolution function (for example delimiting a block of spots on the x axis), it is imposed that the sum of the quantity centered on the maximum defined as follows:

$$RM\bar{S}_{max} = \sqrt{\frac{1}{n_{max}} \sum_{j=-\lambda/4}^{\lambda/4} (H_{max+j}^{\sim} - A\sin(\omega_0 x(\max+j-\alpha\chi)+\varphi))^2} \quad (13)$$

where $n_{max}$=the number of maximum values found, and the quantities centered on the two adjacent minima of the sinusoidal function defined as:

$$RM\bar{S}_{min} = \sqrt{\frac{1}{n_{min}} \sum_{j=-\lambda/4}^{\lambda/4} (H^{\sim}min1+j - A\sin(\omega_0 x(min1+j-\alpha\chi)+\varphi))^2} + \sqrt{\frac{1}{n_{min}} \sum_{j=-\lambda/4}^{\lambda/4} (H^{\sim}min2+j - \sin(\omega_0 x(min+j-\alpha\chi)+\varphi))^2} \quad (14)$$

where $n_{min}$=number of minimum values found should be such that $RM\bar{S}_{max}+RM\bar{S}_{min}<H_{max}$ When these rules are applied, the ends of each block can be automatically delimited.

The next step is to check the first and the last, row and column of each block. Blocks for which the spots at the beginning or the row or column are not illuminated are not detected.

The positions of these unilluminated spots are found by applying cardinal rules between the different blocks. The most probable number of rows and columns in each block are calculated. In blocks for which a row or a column is missing, this row or this column is assigned to one of the ends of the block using the sinusoidal function (9), such that this additional row or column minimizes the Euclidian distance between the sinusoidal functions restricted to the number of spots of blocks located above and below, and on each side of the block considered. This operation may be repeated as many times as necessary if more than one row or more than one column is missing at the ends.

FIG. 15 illustrates an example of a grid placed automatically on a block.

The blocks of a biochip are not necessarily all the same size. The number of rows and columns depends on the selected deposition strategy, the chosen rules being adaptable to the particular strategy.

Identification of Pixels in Each Spot

Once the position of the spots has been found, the last two steps in the image analysis must be performed. These steps may or may not be carried out independently.

The homogeneity of the image obtained by the DNA biochips depends on the type of deposition used: either mechanical deposition or deposition by ink jet.

Figure 16:
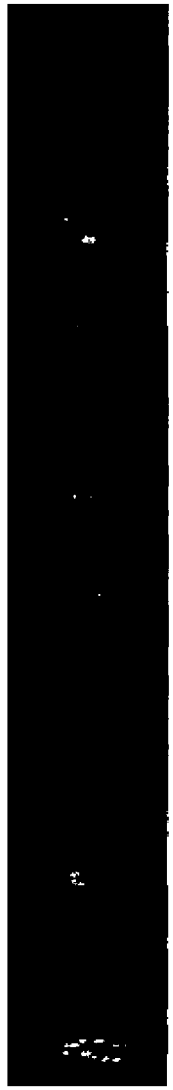
FIG. 16 illustrates an example of spots obtained with a mechanical deposition.

The problem to be solved is unchanged, in other words to determine the significant pixels containing the hybridizing signal, the background noise level and the parasite pixels, for each spot. FIG. 16 illustrates an example of spots obtained by mechanical deposition.

Figure 17:
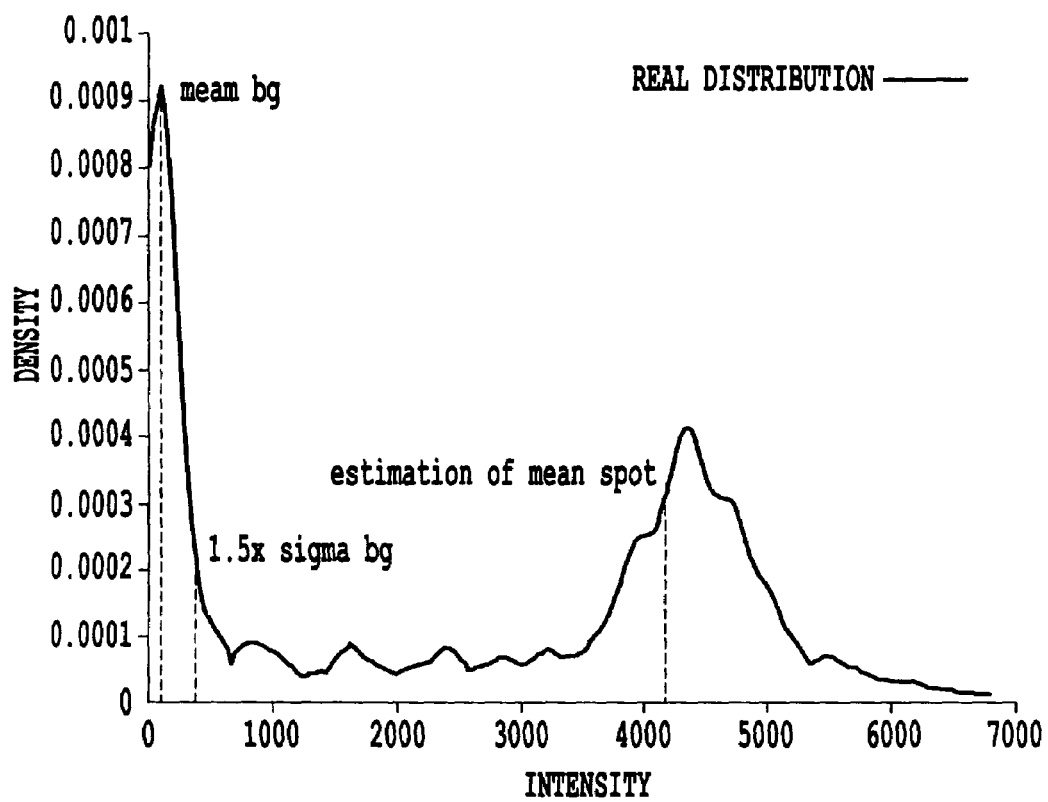
FIG. 17 illustrates the distribution of pixels in a spot.

As illustrated in FIG. 17, a bad estimate of the background noise and parasite pixels will cause a bad estimate of the signal. This FIG. 17 illustrates the distribution of pixels in the spot, the average of the spot intensity being calculated using pixels greater than the average of the pixels in the background noise plus 1.5 times the standard deviation of the background noise.

There are two possible solutions to this problem: eliminate spots with excessive distortion from the expected value, as described in document reference [7], or selecting the pixels in a spot that actually represent the hybridizing signal.

It is important to arrange a homogeneous image, in other words an image in which pixels of the same type are only slightly dispersed (background noise, hybridizing signal) in order to obtain the best position of the hybridizing signal. This type of dispersion is largely due to acquisition conditions, which should be sufficient to optimize detection of weak signals and strong signals.

Figure 18:
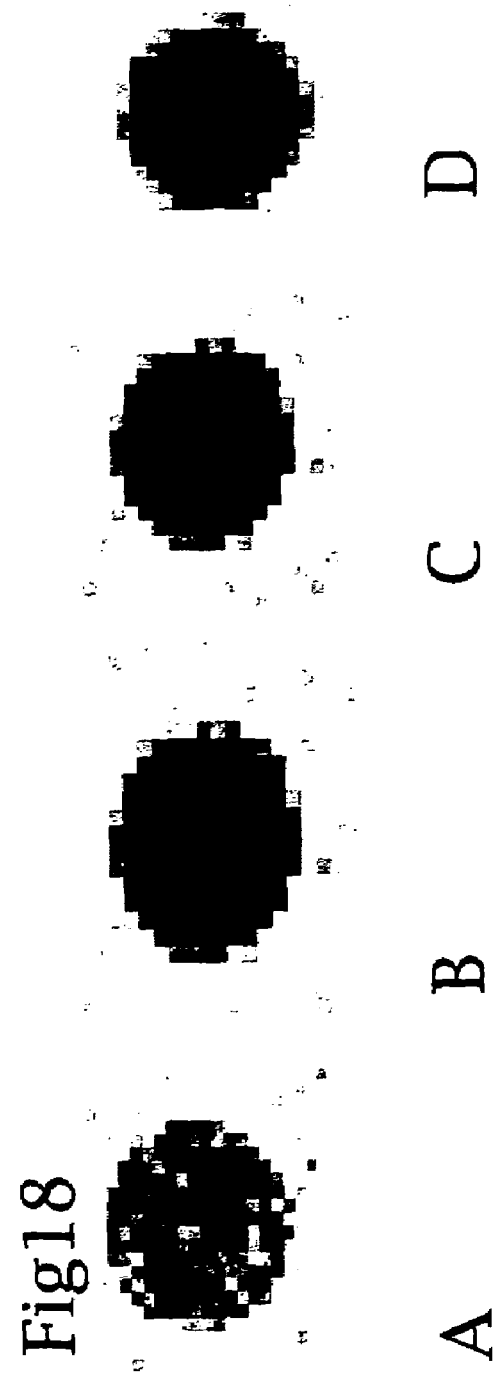
FIGS. 18a to 18d illustrate different images of the same spot acquired in four different conditions, FIGS. 18c and 18d being filtered under different conditions.

FIG. 18 illustrates the different images of a same spot acquired under four different conditions, for example using a Packard scanner and normalized to the same intensity;

a) a single image with a 10 μm resolution, a fast pass, gain=100 PMT 100 (arbitrary scale), b) a single image with 10 μm resolution, a slow pass, gain=80 PMT 80 (arbitrary scale), c) ten independent images with 10 μm resolution, a fast pass, gain=80 PMT 80 (arbitrary scale) then superposition and an average of the image in a single image, d) a single image with 5 μm resolution, a fast pass, gain=80 PMT 80 (arbitrary scale) then reduction to 10 μm eliminating the furthest pixel.

On this figure, the spot is the same spot that was acquired under four different conditions. It is found that it is difficult to apply a strong excitation and a strong detection and to obtain a homogeneous image with a low signal/background noise ratio or with a low signal/spot noise ratio. The acquisition conditions are illustrated in FIGS. 18a and 18b.

One variant consists of making several images with low excitation and low detection, which are accumulated into a single image. As shown in FIG. 18c, a net improvement in the signal/background noise ratio or the signal/hybridizing signal ratio is observed, with a factor of 1.38 (see table 1 at the end of the description). This improvement is faster for the spots signal than for the background noise signal. The mix or overlap between the signals classified as being background noise and signals due to "hybridizing" reduces quickly as images accumulate. However, with the increasing number of acquisitions, a fluorescence extinguishing phenomenon is observed which is greater for strong signals. However, the intensity of the signal is additive for the background noise, therefore there can be an error on the estimate of the hybridizing signals if the accumulation is badly controlled.

Since the variance of the background noise is reduced, the acceptance threshold for low intensity spots is lowered.

Therefore, it is not always desirable or possible to make several acquisitions from the same slide. One variant consists of making a high resolution image and then artificially reducing the resolution of the image by replacing n adjacent pixels by the average of n pixels. This thus reduces the size of the image by n.

FIG. 18d thus illustrates an acquired image at 5 μm adjusted to 10 μm using this variant, which corresponds to n=4.

A homogeneity filter can then be applied by eliminating the pixel with the greatest heterogeneity compared with adjacent pixels. Heterogeneity is estimated at more than 2σ (standard deviation) of the selected homogeneity estimator. In this case, the chosen homogeneity estimator is the average of a window of 16 pixels centered on the four pixels to be averaged, where σ is calculated on the same window of 16 pixels.

The four measurements made are independent. The probability that the same error would be made on the four pixels is very low. The result obtained is an image with a noise intensity reduced by a factor of 1.8. In this case, the intensity of the background noise is reduced by a factor 2.3 and the signal/background noise ratio or the signal/hybridizing signal increases by a factor of 1.27. On the other hand, the average intensity and the variance of the hybridizing signals are only very slightly modified, which results in a lower gain in the signal/noise ratio by a factor of 1.12. As for accumulation, holding the hybridizing signal and reducing the average and the variance of the background noise by the proposed filter, are a means of reducing the spot acceptance threshold intensity. The problem of fluorescence being extinguished is thus eliminated.

Once electronic noise has been minimized, sorting pixels within each spot is a means of identifying the different types of pixels present (background noise, hybridizing signal and parasite signal).

Figure 19:
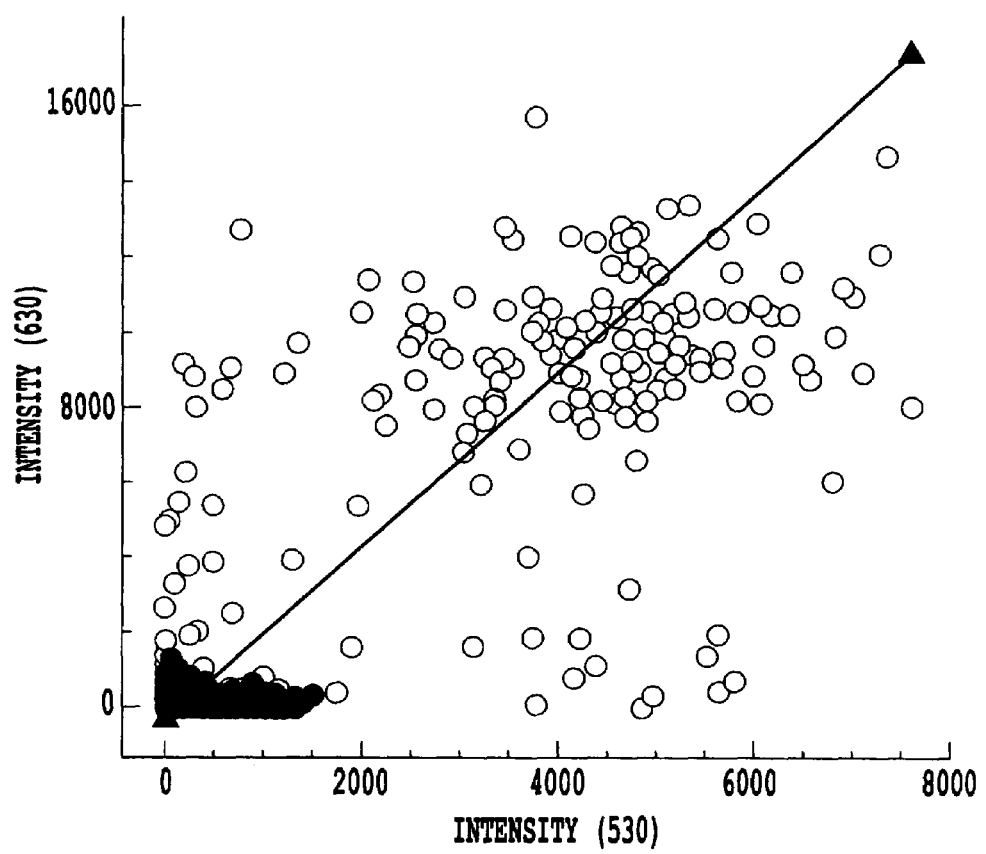
FIG. 19 illustrates an example of a graph obtained by comparing two images of the same spot, pixel by pixel, at different wavelengths (different hybridizing conditions).

The fact that only signal type pixels are retained is a means of keeping or restoring measures that should have been eliminated on normal quality criteria (see document references [7] and [8]). An approximate breakdown into segments by calculating pixel by pixel ratios is not sufficient to differentiate the hybridizing signal from the background noise signal when they are too close, as illustrated in FIG. 19, which gives an example of a graph obtained by comparing two images of the same spot pixel by pixel. An EM (Estimation, Maximization) algorithm approach (see document reference [9]) may be used. However, it has been shown that the signal does not follow a pure Gaussian distribution (see document reference [4]).

Figure 20:
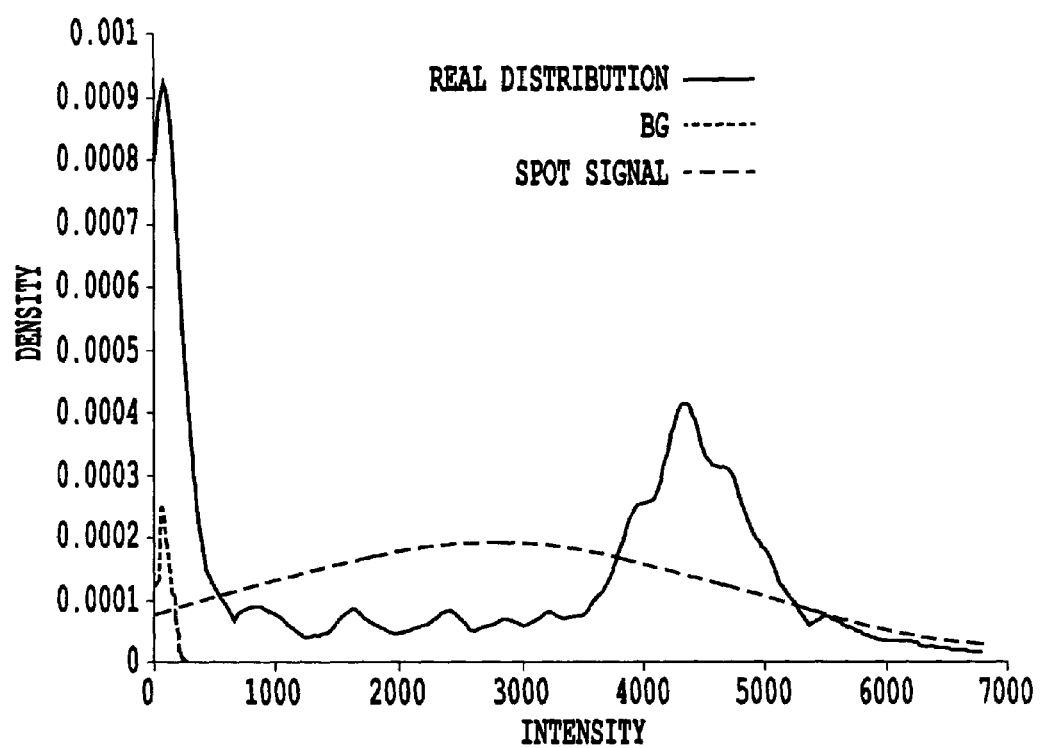
FIG. 20 illustrates an estimate of the different populations of pixels present in a spot using a conventional EM method.

By applying a conventional EM algorithm with 2 or 3 classes based on a Gaussian distribution, the distributions illustrated in FIG. 20 are obtained which illustrates the estimate of the different populations of pixels present in a spot with a conventional EM method with bg: estimated distribution of the background noise, Real distribution: distribution of pixels in the hybridizing signal. No saturating pixel was identified using this method.

This example clearly illustrates that the applied Gaussian assumptions are too wide compared with the real distribution of each class. This is due to the fact that this algorithm assigns transition pixels between the signal and the noise, either at the background noise or at the signal, or at parasite signals.

A modification to this method could make classes smaller and introduce the concept of a pixel that does not belong to any class, by applying a threshold on the calculated probability that it belongs to one of the two or three main classes.

It is then possible to determine the class with the hybridizing signal that is logically the class with the greatest population and usually corresponds to the intermediate class.

Figure 21A:
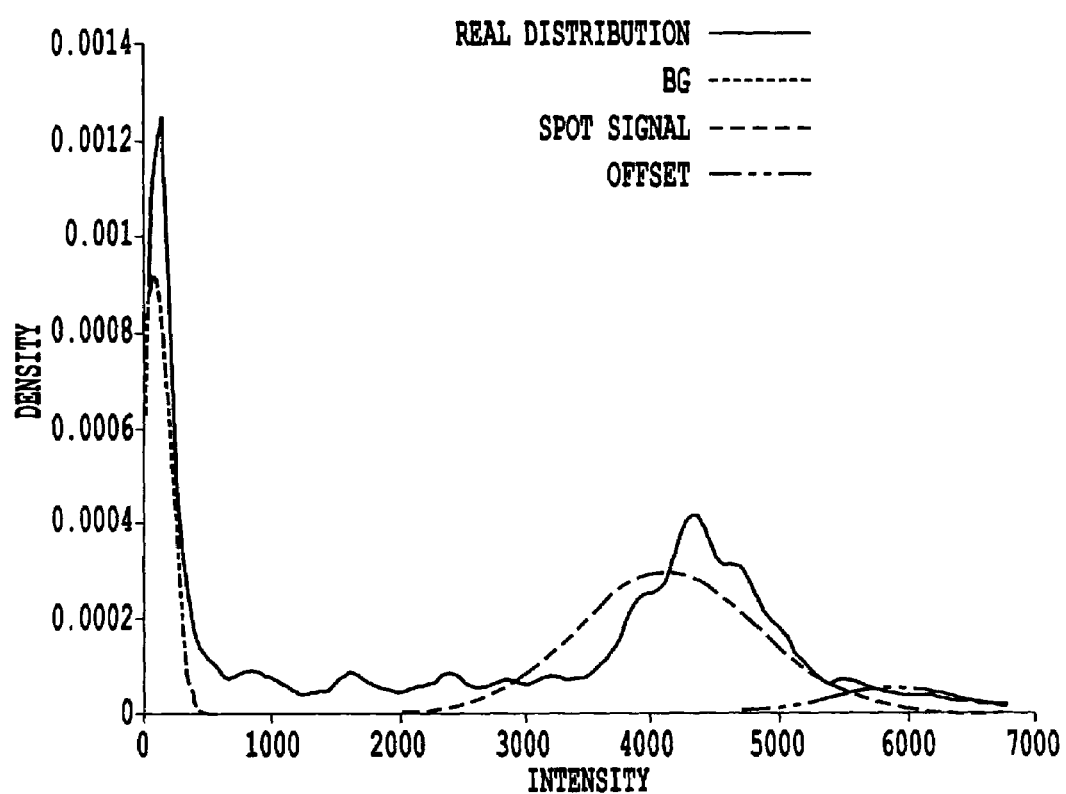
FIG. 21a illustrates an application of the modified EM method to define pixel classes with convergence evaluated with log-probability.

FIG. 21a illustrates an application of the EM method thus modified, to find the pixel classes; convergence being estimated by log probability with bg: estimated distribution of the background noise, Real distribution: distribution of pixels in the hybridizing signal, and offset: saturating pixel.

Figure 21B:
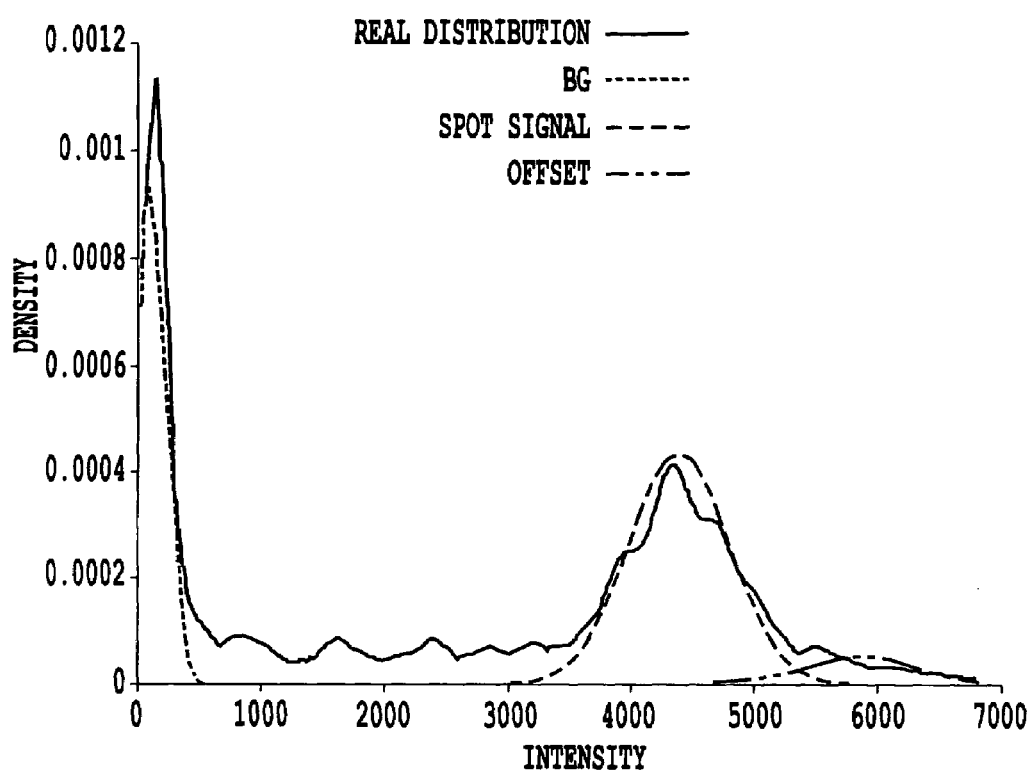
FIG. 21b illustrates an application of the modified EM method to find the pixel classes with the convergence evaluated with the RMS-log-probability.

FIG. 21b illustrates an application of the modified EM method to find pixel classes; convergence being estimated using the RMS-log-probability with bg: estimated distribution of the background noise, Real distribution: distribution of pixels in the spot and offset: saturating pixel.

Thus by using the modified EM method, the background noise is measured within the spot, and therefore it is no longer under or overestimated so that the problem of negative spots can be eliminated.

Since this type of analysis is carried out independently, the problem of perfect superposition of the images is eliminated. Furthermore, the signals closest to the background noise can still be measured reliably.

EM Method

After the automatic pause of a cache delimiting each spot, the method consists of classifying the pixels into three classes iteratively. The parameters of a mix are maximized in order to make this classification.

As a first approximation, the pixels are classified into two and then into three classes if necessary: background noise, hybridizing signal and possibly saturating pixels.

Initializing Step 1

The first step consists of building up a blurred pixel distribution table $C_i^0(k)$, where i is the intensity and k is the class. This table illustrated in table 2 at the end of the description is built up such that the value 1 is assigned for the background noise class and the value 0 is assigned for the hybridizing signal class for pixels for which the intensity is less than the value of the background noise+2 sigma (taken in reference outside the spot). The blurred distribution table $C_i^0(k)$ is set equal to value 0 for the background noise class and 1 for the signal class, for pixels for which the intensity is greater than the value of the background noise+2 sigma (used as a reference outside the spot). Initially, signals larger than 65500 are considered as being saturating and are not included.

This first blurred distribution table with two classes (K=2) is built up for a first segmentation with two classes.

The next step is then to define the probability p(k) of each class, such that:

$$P(k) = \frac{\sum_{i=0}^{65500} n_i(k) C_i(k)}{\sum_{k=1}^{K} \sum_{i=0}^{65500} n_i(k) C_i(k)} \quad (15)$$

where:—$n_i$ is the number of pixels with intensity level i,
  $C_i^0(k)$ is the probability of assigning the intensity level i to class k, and
  P(k) is the probability density of class k,
  K is the number of classes taken into consideration (in this first model, K=2).

The mix parameters:

$$\Theta(P^o(1), \sigma^o(1), \mu^o(1), \ldots, P^o(k), \sigma^o(k), \mu^o(k)) \quad (16)$$

are defined as follows:

$$\mu^o(k) = \frac{1}{\sum_{i=0}^{65500} n_i C_i(k)} \sum_{i=0}^{65500} C_i(k) n_i i \quad (17)$$

$$\sigma^o(k) = \sqrt{\frac{1}{\sum_{i=0}^{65500} n_i C_i(k)} \sum_{i=0}^{65500} C_i(k) n_i i^2 - \mu^{o2}} \quad (18)$$

where:—$n_i$ is the number of pixels with intensity level i,
$C_i^0(k)$ is the probability of assigning the intensity level i to class k,
$\mu^o(k)$ is the average of class k in step 0,
$\sigma^o(k)$ is the standard deviation of class k.

Estimating Step 2

The new blurred distribution table is calculated from parameters $\theta^{m-1}$ such that:

$$C_i^m(k) = \frac{P^{m-1}(k)\Phi_k(i)}{\sum_{k=0}^{K} P^{m-1}(k)\Phi_k(i)} \quad (19)$$

where $$\Phi_k(i) = \frac{1}{\left(\sigma^{m-1}(k)\sqrt{2\pi}\right)} \exp^{-1/2((i-\mu^{m-1}(k))/\sigma^{m-1}(k))^2} \quad (20)$$

Maximizing Step 3

The mix parameters $\theta^m$ are recalculated starting from this new distribution table $C_i^m(k)$.

Steps 2 and 3 are reiterated until convergence of the classification of the log probability defined as:

$$L(\Theta,C) = l(\Theta,C) + E(C) \quad (21)$$

$$l(\Theta, C) = \sum_{k=0}^{K} \sum_{i=0}^{65500} n_i(k) C_i(k) ln(P(k)\Phi_k(i))$$

$$E(C) = \sum_{k=0}^{K} \sum_{i=0}^{65500} n_i(k) C_i(k) ln(C_i(k))$$

This approach imposes:

$$\sum_{k=0}^{K} C_i(k) = 1$$

But the quantity $\theta(K)$ used to calculate whether the pixel belongs to one or the other in each class, can be extremely low for intermediate pixels very far from the considered classes.

The definition of the EM algorithm makes it necessary to assign these pixels to one of the classes, which widens the class distributions and therefore creates an artificial mix of the different classes. The consequence is a bad evaluation of the chosen observable hybridizing intensity (average, median etc.). This problem can be overcome by using a method to relax distances by modifying the quantity $\phi_K$ so that it converges towards 0 for these remote pixels, such as $\theta(K)$:

$$\Phi_k(i) = \frac{1}{\sigma^{m-1}(k)\sqrt{2\pi}} \exp^{-1/2((i-\mu^{m-1}(k))^2/\sigma^{m-1}(k)} \quad (22)$$

Under these conditions, the probabilities $C_i(0)$ and $C_i(1)$ converge towards 0. Thus, a pixel that is too far away for the mix parameters considered is not assigned to either of the two classes in this step. Nor is the pixel used in the calculations in this step.

Similarly, convergence of the log-probability can widen classes simply by stopping the classification early. Therefore, a new convergence estimator is introduced based on the similarity or the calculated distance between the real distribution of the pixels and the recalculated distribution using mix parameters. RMS log-probability is such that:

$$\frac{l(\Theta, C)}{RMS} \quad (23)$$

For example, we could have RMS=1/R, where R is the correlation factor between the theoretical distribution calculated from the mix and the real distribution curve.

Estimating is stopped when this estimator converges. The result is classes much closer to the real distribution.

When the spot contains saturating pixels (more than 65500) a new blurred partition table is created with an additional class K=3 (column) and new levels filling the table up to 65535 pixels (row). The new column is initialized equal to 0 up to level 65500, and then to 1 up to the final level. The additional levels in the existing columns are initialized to 0. The entire procedure is restarted using this new matrix. The upper limit in equations (15), (17), (18) and (21) increases from 65500 to 65535.

Improvement of the Image in Order to Improve Detection of the Position of Spots

The position of spots is determined more easily when there is a contrast between the background noise and the spots signal. This contrast can be increased by using a degrading filter that does not necessarily keep the proportionality of the signals. The filtered image is only used to find the position of the spots. Quantification is done starting from the raw image, or from an image filtered using a non-degrading filter.

The proposed degrading filter is based on the periodicity of the required signal. A threshold is applied to the projection $\overline{H}_i$ (or $\overline{H}_j$) such that if $\overline{H}_i < \overline{H}_i$ threshold=0 or if $\overline{H}_i \geq$ threshold, starting from projections (equation 1) the result is:

$$\overline{H}_i = \frac{\overline{H}_i \times 500 \times maximage}{65535} \quad (24)$$

maximage represents the highest detected intensity in the image the values 500 and 65535 may be changed depending on the required redistribution amplitude in the image.

The threshold is chosen to maximize equation (3):

$$\frac{P(\omega \max)}{\sum_{i=10}^{50} P(\omega i)}$$

calculated from the modified projection $\overline{H}_i$. Once the threshold has been determined, the pixels in image $A_{ij}$<threshold are corrected to 0 ($A_{ij}$=0) in the image and the pixels in image $A1_{ij}$>threshold are corrected to $$\overline{H}_i = \frac{\overline{H}_i \times 500 \times maximage}{65535} \quad (25)$$

It would also be possible to choose to replace the pixels $AI_{ij}$>threshold by a constant value for example such as $A_{ij}=500$.

A second "low pass" type filter is then applied that assigns the average of the signals in a window with (a+1) pixels along the side centered on the pixel (i, j), to each pixel (i, j) in the image such that:

$$A_{ij} = \frac{\sum_{k=i-a}^{i+a} \sum_{l=j-a}^{j+a} A_{k,l}}{(2a+1)^2} \quad (26)$$

Figure 22A:
FIG. 22a illustrates an image before filtering.
Figure 22B:
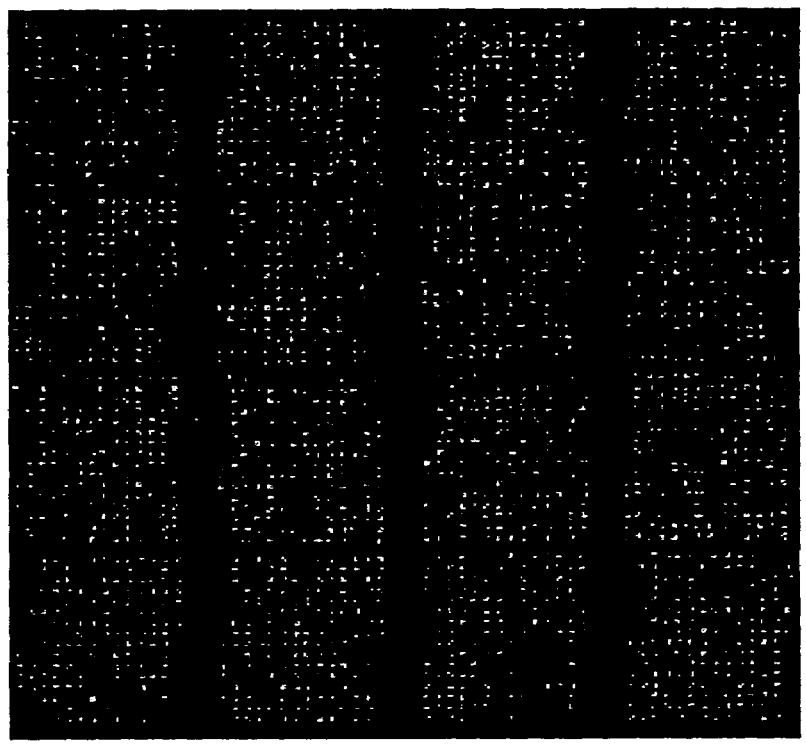
FIG. 22b illustrates this image after degrading filtering.

A large number of parasite signals are thus eliminated, application of these filters gives the results shown in FIGS. 22a and 22b, where FIG. 22a illustrates an image before filtering, and FIG. 22b illustrates the same image after filtering.

Realignment of Spots (Cutting the Image)

In some cases the spots are not well aligned in x and/or in y which can make it more difficult to determine the cut lines between blocks and to position the grids. This problem can be overcome by calculating the histogram of the first m rows in the image as follows:

$$\overline{H}(m)_j = \frac{\sum_{i=0}^{m} H_{ij}}{m}$$

Row m+1 is then added to the histogram with all possible offsets or α translations between $+\lambda_0/2$ and $-\lambda_0/2$ such that:

$$\overline{H}(m\alpha)_j = \overline{H}(m)_j + A_{(m+1)j+\alpha}$$

The value of the power of the Fourier transform of the histogram $\overline{H}(m\alpha)_j$ is calculated for each translation α. The value of the shift $\alpha_{max}$ maximizing the score is kept. Row m+1 is shifted by the quantity $\alpha_{max}$ in the image. This procedure is performed for all rows in the image starting from row position $m=\lambda_0$ until the position $x=n-\lambda_0$ where n is the last row. The same procedure may be applied to the image in y.

As a complement to the EM method, a morphomathematical approach can be carried out on each frame using connectivity (see document reference [10]) to define all objects present in the frame. These objects are used to define and initialize additional classes in the matrix $C_i(k)$. Each object found defines a class, in addition to the saturating pixels class and background noise pixel classes. The EM method may or may not merge classes of the different objects and is used to define the class of pixels in the hybridizing signal while excluding parasite pixels, for example caused by dust.

Figure 23A:
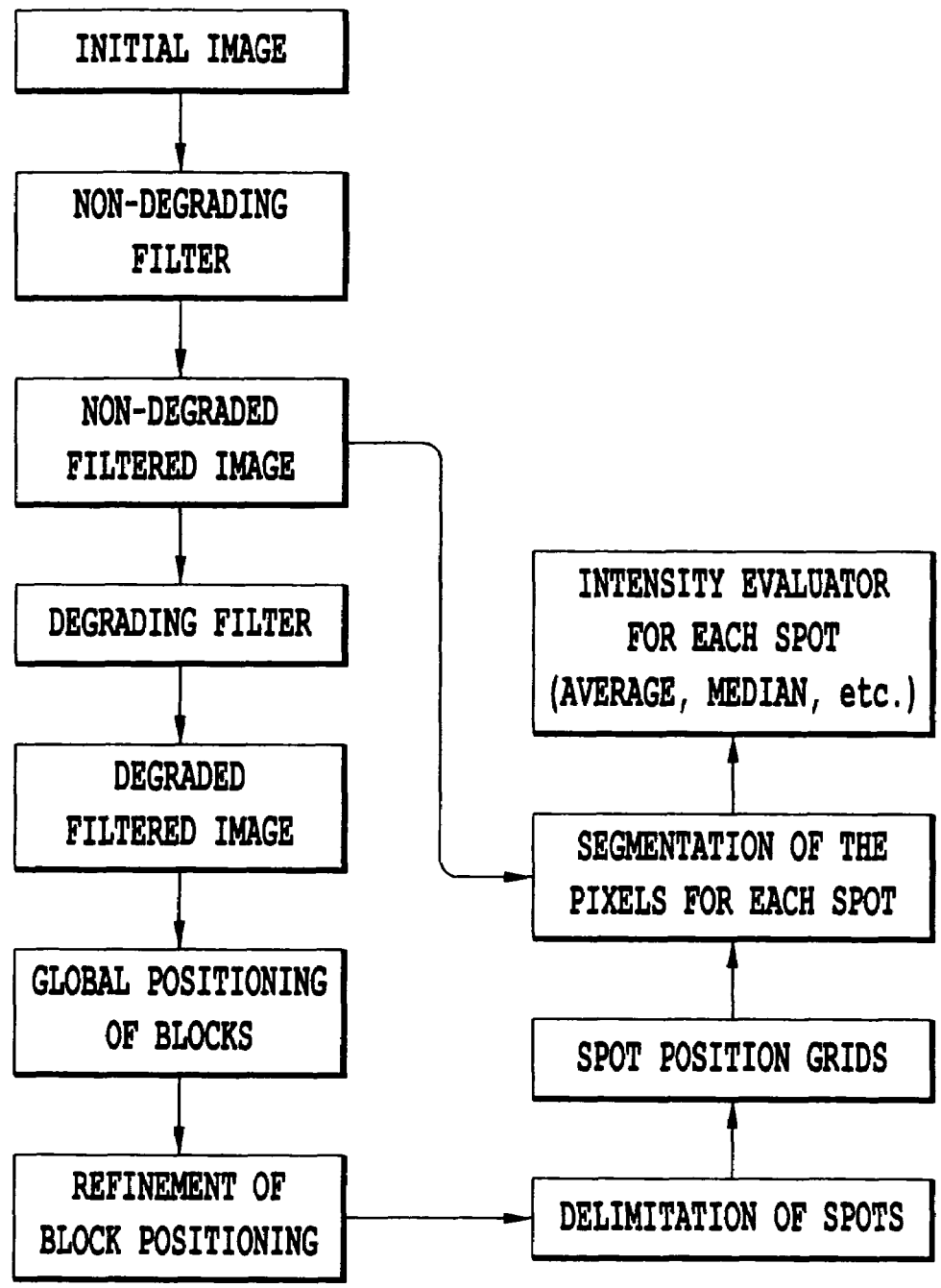
FIGS. 23a, 23b and 23c illustrate flow charts that show complete processing for a single image, complete processing for several images of the same slide with different hybridizing conditions of the same slide with superposition of images, and minimum processing for an image to be used to implement the process according to the invention, respectively.
Figure 23B:
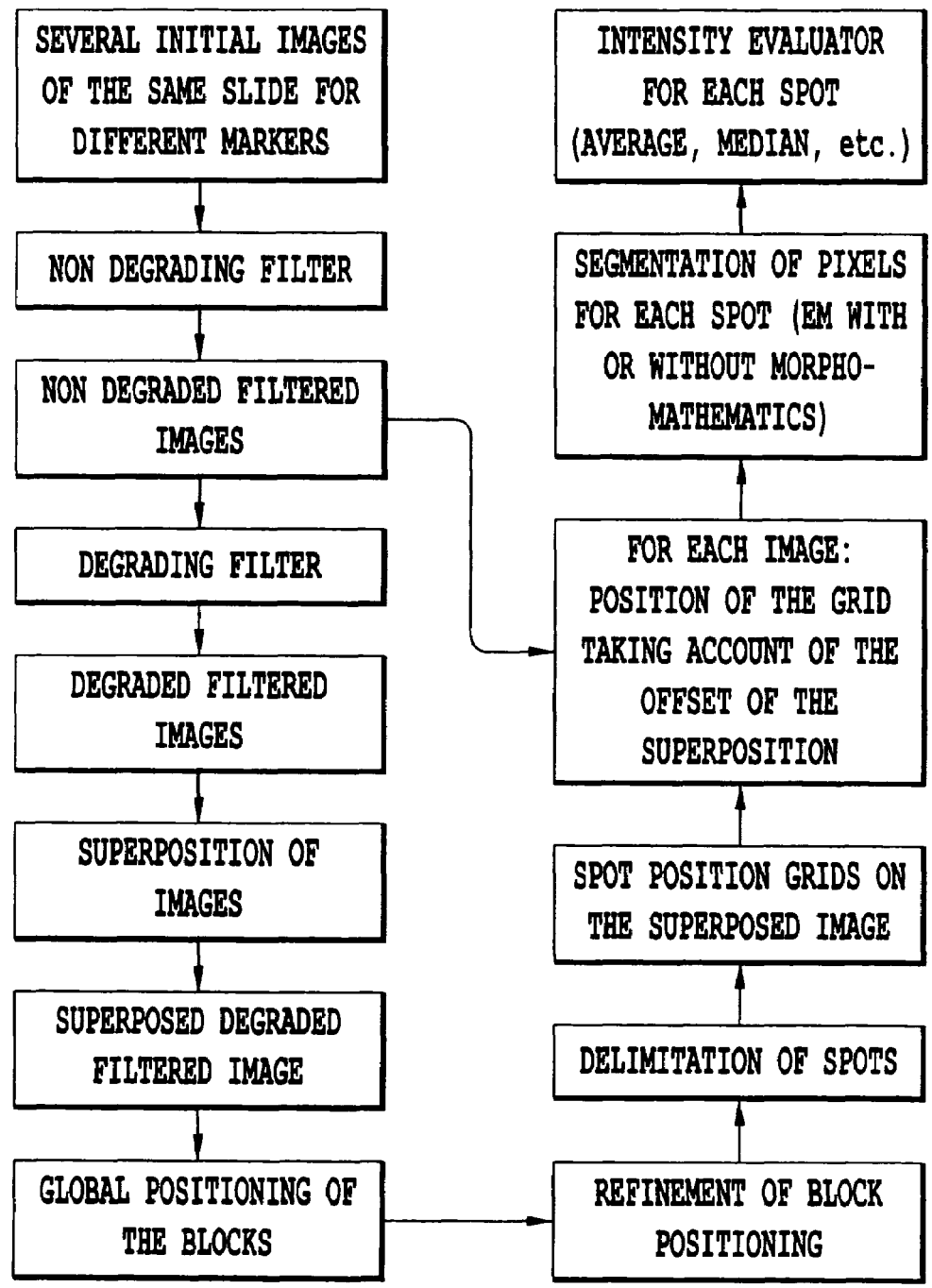
Figure 23C:
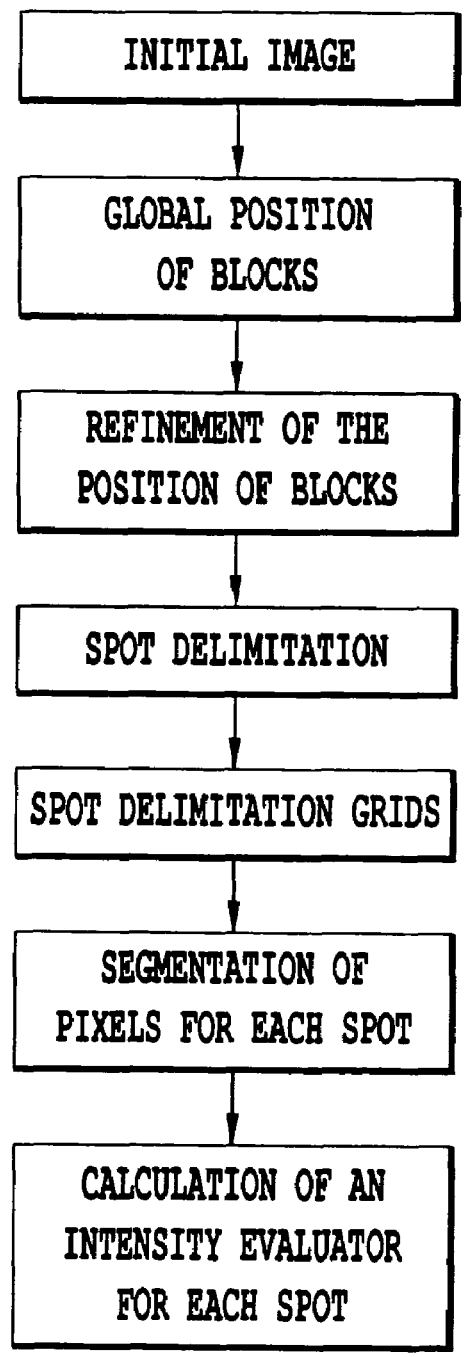

FIGS. 23a, 23b and 23c illustrate all steps to be followed to quantify the spot, in three example embodiments, as follows respectively:

complete treatment for a single image, in which there is a sequence consisting of a non-degrading filter step, a degrading filter step, global positioning of the blocks, refinement of the position of the blocks, delimitation of the spots, breakdown on the pixels in each spot into segments and calculation of an intensity evaluator for each spot, complete treatment for several images, with different hybridizing conditions for the same support slide, with superposition of images, that uses the same steps as shown in FIG. 23a with an image superposition step, minimum processing for an image, in which there are not the two preliminary filter steps shown in FIG. 23a.

TABLE 1

| filter | Basic-bg M | Basic-bg V | Segbg M | Segbg V | Basic noise bg | Seg noise bg | Basic sig M | Basic sig V | Seg sig M | Seg sig V |
| --- | --- | --- | --- | --- | --- | --- | --- | --- | --- | --- |
| 1 | 138.78 | 220.2 | 184.7 | 148.96 | 1.57 | 0.81 | 1939.92 | 1846.96 | 3334.6 | 584.87 |
| 2 | 276.29 | 315.08 | 268.84 | 202.52 | 1.12 | 0.75 | 3862.48 | 3531.11 | 6178.21 | 813.47 |
| 3 | 415.29 | 389.99 | 369.32 | 256.86 | 0.93 | 0.69 | 5667.72 | 5075.32 | 8585.21 | 1010.47 |
| 4 | 553.15 | 452.1 | 481.28 | 305.03 | 0.81 | 0.63 | 7338.38 | 6485.77 | 10409.59 | 1105.46 |
| 5 | 691.99 | 508.38 | 613.38 | 357.27 | 0.73 | 0.58 | 8831.61 | 7715.81 | 11873.77 | 1240.01 |
| 6 | 827.72 | 558.23 | 726.36 | 388.72 | 0.67 | 0.53 | 10184.62 | 8800.88 | 12970.04 | 1337.95 |
| 7 | 967.21 | 606.47 | 845.26 | 405.77 | 0.62 | 0.48 | 11396.33 | 9739.8 | 14022.57 | 1421.91 |
| 8 | 1103.76 | 652.31 | 980.27 | 434.29 | 0.58 | 0.44 | 12515.29 | 10579.73 | 15008.61 | 1507.33 |
| 9 | 1242.97 | 697.07 | 1164.93 | 497.18 | 0.55 | 0.41 | 13574.01 | 11366.33 | 16042.05 | 1536.77 |
| 10 | 1380.04 | 739.33 | 1347.23 | 561.26 | 0.53 | 0.38 | 14592.68 | 12112.53 | 17106.97 | 1598.02 |
| F | 76.17 | 95.6 | 76.84 | 58.84 | 1.22 | 0.72 | 1832.03 | 1663.32 | 3074.38 | 352.13 |

TABLE 2

| Level | Class bg (k = 1) | Class signal (k = 2) |
| --- | --- | --- |
| i = 0 | 1 | 0 |
| i = 1 | 1 | 0 |
| ... | ... | ... |
| | 0 | 1 |
| i = 65500 | 0 | 1 |

REFERENCES

[1] McGall, G., Labadie, J., Brock, P., Walfraff, G., Nguyen, F. & Hinsgerg, W. (1996). "Light directed synthesis of high density oligonucleotide arrays using semiconductor photoresist" (Proc. Natl. Acad. Sci. USA, 93, 13555–13559).
[2] Ramsay, G (1997). DNA chips: state of the art. "Nature Biotechnologies" 16, 40–44.
[3] Service, R. F. (1998). "DNA chips survey an entire genome". Science 281, 1122.
[4] S. Granjeaud, C. Nguyen, D. Rocha, R. Lutton, and B. R. Jordan. "From hybridization to numerical values: a practical, high throughput quantification system for high density filter hybridization". Genetic Analysis: Biomolecular Engineering, 12:151–62, 1996.
[5] Y. Chen, E. R. Dougherty, and M. L. Bittner. "Ratio-based decisions and quantitative analysis of cDNA microarray images". Journal of Biomedical Optics, 2 (4): 364–74, 1997.
[6] reference Internet Dapple: "www.cs.wustl.edu/r j.buhler/research/dapple/"
[7] Kadoka K, Miki R, Bono H, Shimizu K, Okazaki Y, Hayashizaki Y. (2001) "Preprocessing implementation for microarray (PRIM): an efficient method for processing cDNA microarray data. Physiol Genomics" 19; 4(3): 183–8.
[8] Wang X, Ghosh S, Guo S W. (2001) "Quantitative quality control in microarray image processing and data acquisition. Nucleic Acids Research", 29, 15 e75.
[9] Celeux, G. and Diebolt, J. (1991) "The EM and the SEM algorithms for mixtures: Statistical and numerical aspects". Cahier du CERO 32, 135–151.
[10] D Marr: "Vision", EDW.h.freemar and co 1982.

GLOSSARY

Probe: molecule of nucleic acid, in which the sequence is complementary to a searched sequence. For DNA chips, they are fixed onto the support.
DNA or Deoxyribonucleic Acid: support molecule for genetic information.
mRNA: messenger RiboNucleic Acid. Molecular form in which the genetic message coded in genes is transferred from the nucleus to the cytoplasm. This mRNA is used in the cytoplasm for synthesis of a protein.
cDNA or complementary DNA: single strand DNA that is complementary to a mRNA obtained by an inverse transcription. Unlike DNA, it does not have any introns (non-coding sequences). It may also be in the form of a double strand, by copying the first strand by a polymerase DNA.
Condition: represents all RNA or cDNA extracted from cells in a particular state.
Sequencing: process used to determine the order (the sequence) of amino acids in a protein or bases in nucleic acids (DNA and RNA).
Retro-transcription: enzymatic reaction enabling synthesis of a complementary DNA molecule starting from a mRNA molecule.
PCR (Polymerase Chain Reaction): polymerization chain reaction. This is an exponential amplification technique for a DNA or a cDNA module. It is used to obtain a large number (several million) of identical copies of a given molecule of DNA, starting from a fragment of DNA and the polymerase DNA taq. This reaction is done in vitro.
Molecular hybridizing: effect of matching two nucleic sequences. It is based on the principle of complementarity of nucleic bases, most particularly between DNA and the strand of RNA or cDNA. It is used to demonstrate a nucleic acid sequence within a cell or a tissue.
Differential hybridizing: competitive hybridizing of molecules output from two different samples.
Pixel: in the case of the scanner used in the laboratory, unit of intensity of the image, corresponding to an area of 5 or 10 microns depending on the resolution used.
Sage: "Serial Analysis of Gene Expression" (Velculescu et al. 1995). Technique for quantitative measurement of the transcriptome of a cell.
Genome: All DNA for an individual or a species.
Transcriptome: All messenger RNA transcribed from the genome into a cell at time t.
Proteome: All proteins in a cell at time t.

The invention claimed is:

1. Image analysis process for measuring a periodic signal on biochips organized into one or several blocks each comprising a large number of spots each composed of at least one probe, the process comprising the following steps:
placing deposits spaced apart on a new biochip at a constant interval in order to form the spots, the spots appearing periodically in a periodic position in a manner that produces a new periodic signal,
using the periodic property of the new periodic signal to automatically locate blocks and spots, the periodic property of the new periodic signal being used to associate x and y coordinates with an image.

2. The process according to claim 1, further comprising steps of:
obtaining averaged projections orthogonal to the x and y axes of a plane of the biochip; and
using the averaged projections to amplify the new periodic signal thus obtaining two histograms, $\overline{H}_j$ and $\overline{H}_i$.

3. The process according to claim 2, further comprising steps of:
obtaining a discrete single dimensional Fourier transform (FFTD); and
using the discrete single dimensional Fourier transform (FFTD) to identify main frequencies of the image in x and y,
wherein the maximum power of the discrete single dimensional Fourier transform $P(\omega)$ is used to produce the values $\omega_0$, from which the spot repetition periodicities $\lambda_0$ in x and y are deduced.

4. The process according to claim 3, wherein a variable threshold is applied to the two histograms $\overline{H}_j$ and $\overline{H}_i$, an optimum threshold being given by the value that gives a maximum value of the equation $$P(\omega_{\max}) \bigg/ \sum_{i=10}^{50} P(\omega i),$$

a distribution of the periodicity λ then being examined along the two histograms $\overline{H}_j$ and $\overline{H}_i$, a window with a size 2 $\lambda_0$ sliding along the two histograms, and in which variations of the power of the discrete single dimensional Fourier transform of these histograms are explored locally, regions in which there is a loss of power corresponding to regions between blocks, and this method supplies a global breakdown of the image.

5. The process according to claim 4, wherein a window with a width of $\lambda_0$ and a length of 2 $\lambda_0$ centered on a global cut-out row is used to produce a fine delimitation of boundaries of each block, and the presence of excessively intense and therefore suspicious signals can then be explored locally, and a limit of the blocks around the suspicious signal may be redefined if necessary, and in which this is achieved by firstly extending the window by $\lambda_0/2$ on one side of the limit and then on the other side, and in which if the suspicious signal increases only for one of two extensions of the window, the limit of the block is shifted by $\lambda_0$ into an adjacent block for which there was no increase in the suspicious signal, and in which if there was no increase in the suspicious signal or if the suspicious signal was increased for two shifts, then either the suspicious signal was a parasite signal or the two blocks are very close, in which in both cases a probability of the suspicious signal being right or left of a cut line is calculated, and wherein $P(\omega)$ is obtained for each half projection with and without a suspicious signal, gain then being equal to:

$$\text{Gain} = \frac{P(\omega + \text{signal})}{P(\omega - \text{signal})}$$

wherein, if the gain is greater than 1 for one half projection only, the suspicious signal considered is assigned to it, by shifting the cut line by $\lambda_0/2$ into the adjacent block; if the gain is not greater than 1 for either of the two blocks, then it is determined to be a parasite signal and the cut line is not shifted; if the gain is greater than 1 for each half projection, the suspicious signal is in phase with the half projections and therefore the blocks are very close and in phase, and the suspicious signal is assigned to the block for which the gain is highest, by shifting the cut line by $\lambda_0/2$ into the adjacent block.

6. The process according to claim 1, wherein isolating unilluminated spots comprises steps of:

making histograms $\overline{H}_j$ and $\overline{H}_i$ for rows and columns of a block respectively; and applying a FFTD transform to the two histograms in each block, wherein a maximum value of power $P(\omega)$ gives a periodicity $\lambda_0$ of the spot repetition, and in which the least squares method is used to align projections with a sine curve with the following equation:

$$A \sin(\omega_0 X_i + \Phi)$$

$$\text{where:} \quad -\omega_0 = \frac{2\pi}{\lambda_0}$$

A: average amplitude of projections, $\Phi$: phase shift to be determined.

7. The process according to claim 6, further comprising steps of:

applying a digital reconstruction algorithm to the histograms $\overline{H}_j$ and $\overline{H}_i$, recreating a recreate periodic signal with similar amplitudes as the histograms, by using the histograms, $\overline{H}_j$ and $\overline{H}_i$, and starting from initial projections;

producing a binarized representation of the created history using a threshold; and localizing the precise positions of the spots present using the threshold.

8. The process according to claim 7, wherein the binarized projection is convoluted using a sinusoidal function of $\lambda_0$ as follows:

$$\tilde{H}_i = \sum_{j=0}^{\lambda_0/2} (A \sin(\omega \text{ time } j) x H b_{i+j-\lambda/4})$$

and wherein searching the minimum and maximum values of the convolution function makes it possible to automatically rebuild a grid surrounding all detectable spots.

9. The process according to claim 1, wherein several images with low excitation and low detection are created and accumulated into a single image.

10. The process according to claim 1, wherein a high resolution image is created and the resolution of the image is then reduced artificially by replacing n adjacent pixels by an average of the n adjacent pixels to reduce size of the image by a factor of n, and a homogeneity filter is applied to eliminate the pixel with the greatest heterogeneity with regard to the adjacent pixels.

11. The process according to claim 1, wherein pixels within each spot are sorted to identify different types of pixels present: background noise, hybridizing signal, parasite signal.

12. The process according to claim 1, wherein a modified EM algorithm is applied in which classes are made smaller and a concept of a pixel that does not belong to any class is introduced, by applying a threshold to a calculated probability that a pixel belongs to one of two or three main classes.

13. The process according to claim 12, further comprising the following steps:

initializing by building up a blurred distribution table $C_i(k)$ of the pixels;

calculating a new blurred distribution table;

recalculating mix parameters $\Theta^m$, wherein the calculating and recalculating are reiterated until convergence of a log-probability classification.

14. The process according to claim 13, wherein a new convergence estimator is introduced based on a similarity or calculated distance between a real distribution of pixels and a recalculated distribution using the mix parameters.

15. The process according to claim 1, further comprising the following steps:

filtering background noise, by very slightly reducing a suspicious significant signal and by increasing a signal to noise ratio, for the image increasing the image contrast between background noise and hybridizing signal, positioning the blocks on the image of the biochip staffing from external data about the number of blocks in rows and in columns, automatically determining the position of each spot, including the position of spots for which there was no new periodic signal because there was no hybridizing within its block, automatically segmenting the spot to determine pixels representative of the reaction and to calculate an evaluator of the spot signal by an average or a median.

16. The process according to claim 15, wherein a method based on identification of the local loss of the new periodic signal is used during an initialization, such that the power of a Fourier transform of a spot projection signal onto axes is used by rows or by columns.

17. The process according to claim 15, wherein a first filter is used during the filtering to rectify the image, if necessary, by alignment of the spots in the same block.

18. The process according to claim 15, wherein a second filter is used during the filtering to not reduce a level of new periodic signals specifically originating from the spots and to reduce the level of other types of signals.

19. The process according to claim 15, wherein the position of each block in the image is refined.

20. The process according to claim 15, wherein hybridizing pixels are broken down into segments using an EM method.

21. The process according to claim 20, wherein a constraint in the EM method used is relaxed, so that pixels too far away from assumed classes are not assigned.

22. The process according to claim 15, wherein a morphomathematical method defines objects present in a frame of the spot to initiate segmentation classes.

* * * * *